(12) United States Patent
Chopra et al.

(10) Patent No.: US 10,289,496 B1
(45) Date of Patent: May 14, 2019

(54) PARALLEL PROXY BACKUP METHODOLOGY

(71) Applicant: EMC Corporation, Hopkinton, MA (US)

(72) Inventors: Shelesh Chopra, Bangalore (IN); Yashomathi Krishnamurthy, Bangalore (IN); Arathi Bhandari, Bangalore (IN); Gajendran Raghunathan, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 402 days.

(21) Appl. No.: 14/863,278

(22) Filed: Sep. 23, 2015

(51) Int. Cl.
*G06F 11/14* (2006.01)
*G06F 17/30* (2006.01)

(52) U.S. Cl.
CPC ...... *G06F 11/1461* (2013.01); *G06F 11/1451* (2013.01); *G06F 17/30584* (2013.01); *G06F 17/30595* (2013.01); *G06F 2201/80* (2013.01)

(58) Field of Classification Search
CPC ............ G06F 11/1461; G06F 11/1451; G06F 17/30584; G06F 17/30595
USPC ................................................. 707/654, 658
See application file for complete search history.

(56) References Cited

U.S. PATENT DOCUMENTS

| | | | | |
|---|---|---|---|---|
| 5,852,724 A * | 12/1998 | Glenn, II | ................ | H04L 29/06 709/239 |
| 8,140,791 B1 * | 3/2012 | Greene | ............... | G06F 11/1464 711/162 |
| 9,069,800 B2 * | 6/2015 | Habermann | ........ | G06F 11/1464 |
| 9,201,887 B1 * | 12/2015 | Earl | .................. | G06F 17/30088 |
| 9,501,544 B1 * | 11/2016 | Singhal | ................... | G06F 11/14 |
| 2003/0126202 A1 * | 7/2003 | Watt | ...................... | G06F 9/4401 709/203 |

(Continued)

OTHER PUBLICATIONS

TriCore Solutions Inc. â€œUnderstanding Backups with SQL Server AlwaysOn High Availability Mirrors.â€ May 13, 2015. Accessed Oct. 23, 2017 from <info.tricoresolutions.com/blog/understanding-backups-with-sql-server-alwayson-high-availability-mirrors> (Year: 2015).*

(Continued)

*Primary Examiner* — Robert W Beausoliel, Jr.
*Assistant Examiner* — Arthur Ganger
(74) *Attorney, Agent, or Firm* — Womble Bond Dickinson (US) LLP

(57) ABSTRACT

Embodiments describe concurrently backing up data associated with a relational database management system (RDBMS). In an embodiment, a request is received to back up data from multiple nodes to a target storage source. The multiple nodes are configured to provide storage services to data associated with the RDBMS and are communicatively coupled to a backup server configured to manage backup of one or more storage devices. In response to the request, one or more preference nodes are identified from multiple nodes based on a preference configuration. Using a backup algorithm, portions of the backup to be performed are assigned to one or more preference nodes selected from the identified preference nodes. The backup operations are initiated using the selected preference node(s). Each portion is a distinct subset of the data to be backed up and each of the selected preference node(s) is assigned a unique portion.

18 Claims, 11 Drawing Sheets

(56) References Cited

U.S. PATENT DOCUMENTS

| | | | |
|---|---|---|---|
| 2004/0268068 A1* | 12/2004 | Curran | G06F 11/1451 711/162 |
| 2005/0193179 A1* | 9/2005 | Cochran | G06F 11/2058 711/162 |
| 2006/0158668 A1* | 7/2006 | Maier | H04N 9/3158 358/1.9 |
| 2011/0082832 A1* | 4/2011 | Vadali | G06F 11/1451 707/615 |
| 2015/0370651 A1* | 12/2015 | Gaza | G06F 11/1458 707/652 |

OTHER PUBLICATIONS

SQLGardner. "SQL 2012 AlwaysOn and Backups — Part 2 — Configuring Backup Preferences and Automating Backups." Microsoft, Jul. 21, 2012. Accessed Oct. 23, 2017 from <blogs.msdn.microsoft.com/sqlgardner/2012/07/21/sql-2012-alwayson-and-backups-part-2-configuring-backup-preferences-and-automating-backups/> (Year: 2012).*

Microsoft, Inc. "Active Secondaries: Backup on Secondary Replicas." Active Secondaries: Backup on Secondary Replicas (AlwaysOn Availability Groups), accessed Oct. 23, 2017 from <web.archive.org/web/20150114095634/http://msdn.microsoft.com:80/en-us/library/hh245119.aspx> (Year: 2014).*

Murilo Miranda."AlwaysOn Availability Groups—How to set up AG between a clustered and standalone instance (Part 3)". Published May 12, 2015. Accessed Aug. 14, 2018 from <https://www.sqlshack.com/alwayson-availability-groups-how-to-setup-ag-between-a-clustered-and-standalone-instance-part-3/> (Year: 2015).*

Daniel Pelegrini et al. "Is it possible to have one server acting as secondary for two primaries on AG?" Published Jun. 1, 2016. Accessed Aug. 4, 2018 from <https://dba.stackexchange.com/questions/140157/is-it-possible-to-have-one-server-acting-as-secondary-for-two-primaries-on-ag> (Year: 2016).*

Allan Hirt. "Allan's AlwaysOn Availability Groups FAQ" Published Apr. 13, 2012. Accessed Aug. 14, 2018. <https://sqlha.corn/2012/04/13/allans-alwayson-availability-groups-faq/> (Year: 2012).*

* cited by examiner

PARALLEL PROXY BACKUP METHODOLOGY

FIELD

Embodiments described herein relate generally to data storage systems. More particularly, embodiments described herein relate to backing up data associated with a relational database management system (RDBMS).

BACKGROUND

A relational database management system (RDBMS) is a database management system (DBMS) that is commonly used for storage of information in databases. One RDBMS is a software application that has a primary function of storing and retrieving data requested by other software applications that run either on the same computer executing the RDBMS or on another computer across a network (including the Internet).

An RDBMS can store data using a federated backup, which is a type of backup that includes backing up data by distributing the data on multiple locations independent of the physical location of the data. In this scenario, the locations can be on the same computing system or on different computing systems because the data is managed by the RDBMS rather than by a particular host. This type of backup maintains the logical view of the data as it is viewed by the RDBMS.

Generally, federated backups that are performed by an RDBMS can utilize multiple proxy nodes that each have a copy of the data to be backed up. One limitation of such a federated backup is that data is copied from the proxy nodes to a target storage system in a sequential manner—i.e., the data is backed up from the proxy nodes consecutively (as opposed to concurrently). As a result, the backup window can have a suboptimal duration.

BRIEF DESCRIPTION OF THE DRAWINGS

Embodiments described herein are illustrated by way of example and not limitation in the figures of the accompanying drawings in which like references indicate similar elements.

DETAILED DESCRIPTION

Figure 1:
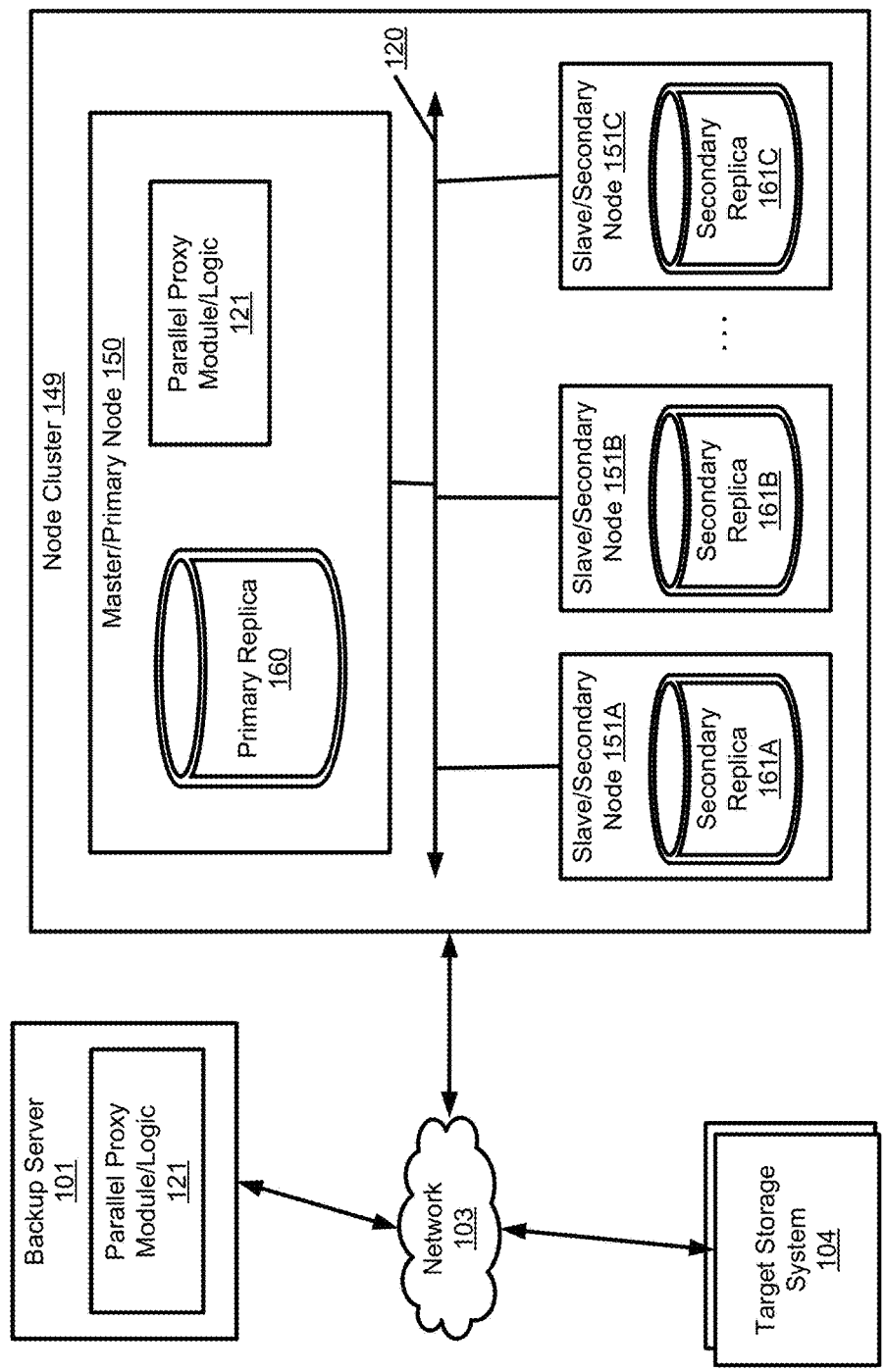
FIG. 1 is a block diagram illustrating a storage system capable of performing a backup of data associated with a relational database management system (RDBMS) in accordance with one embodiment.

Various embodiments and aspects of the embodiments set forth herein will be described with reference to details discussed below, and the accompanying drawings will illustrate the various embodiments. The following description and drawings are illustrative of the embodiments described herein and are not to be construed as limiting any of the embodiments described herein. Numerous specific details are described to provide a thorough understanding of various embodiments described herein. However, in certain instances, well-known or conventional details are not described in order to provide a concise discussion of the embodiments described herein.

Reference in the specification to "one embodiment," "an embodiment," "alternate embodiment," "another embodiment," and their respective variations means that a particular feature, structure, or characteristic described in connection with the embodiment can be included in at least one embodiment of the invention. The appearances of the phrases "in one embodiment," "in an embodiment," "in alternate embodiment," "in another embodiment," and their respective variations in various places in the specification do not necessarily refer to the same embodiment.

In the following description and claims, the terms "coupled" and "connected," along with their derivatives, may be used. It should be understood that these terms are not intended as synonyms for each other. "Coupled" and its variations are used to indicate that two or more devices or components, which may or may not be in direct physical or electrical contact with each other, co-operate or interact with each other. "Connected" and its variations are used to indicate the establishment of communication between two or more devices or components that are coupled with each other. For example, two devices that are connected to each other are communicatively coupled to each other. "Communication" and its variations includes at least one of transmitting or forwarding of information to a device or component or receiving of information by a device or component.

Generally, federated backups that are performed using a relational database management system (RDBMS) can utilize multiple proxy nodes that each have a copy of the data to be backed up. One limitation of such a federated backup is that data is backed up from the proxy nodes to a target storage system in a sequential manner—i.e., the data is backed up from the proxy nodes one at a time (as opposed to concurrently). In particular, even if the data to be copied exists on several proxy nodes, each proxy node must complete its backup before any other proxy nodes can begin their assigned backups. As a result, the backup window can have a suboptimal duration. As backup challenges become increasingly complex, and as consumer service level agreements (SLAs) become more demanding, there is a need to reduce the backup window.

Embodiments described herein can assist with reducing the backup window when federated backups are performed using an RDBMS by providing an improved technique of backing up data using an RDBMS. Furthermore, the embodiments described can assist with intelligently splitting the backing up of data into subsets between multiple nodes based on at least one of load balancing, fault tolerances, or resources available for parallel processing. In this way, the embodiments described herein can assist with increasing the likelihood of meeting commitments in consumer service level agreements.

According to some embodiments, a backup server is configured to manage a backup for a multiple of storage systems or storage applicance devices, and each of a primary node and one or more secondary nodes are configured to provide storage and retrieval services to data of the multiple of storage devices via a relational database management system (RDBMS). In one embodiment, the backup server sends a request to multiple nodes requesting a backup of data stored in the multiple nodes to a target storage source. The multiple nodes include the primary node and the one or more secondary nodes. The primary node communicates with the backup server and the one or more secondary nodes. The primary node controls the secondary node(s) to execute the backing up of the data. The RDBMS can be any type of database management system (DBMS) that uses structured query language (SQL).

In one embodiment, at least one of the primary node or the backup server identifies and selects at least one preference node from the multiple nodes. In one embodiment, this identification and selection includes processing a configuration file to determine the preference nodes. Alternatively, the identification and selection is based on a pre-set configuration policy within the RDBMS.

At least one of the primary node or the backup server can assign, using a backup algorithm, portions of the backup to be performed by one or more nodes that are selected from the identified preference node(s). In one embodiment, the data to be backed up is divided into separate portions—i.e., each portion of the backup is a distinct subset of the data to be backed up. Furthermore, each of the selected preference node(s) is assigned a unique portion that is different from other portions assigned to other selected preference node(s). In one embodiment, at least one of the primary node or the backup server stores the assignments in a backup schedule. In one embodiment, the primary node receives the backup schedule from the backup server. In a further embodiment, the primary node processes the received backup schedule and, based on the processing, the primary node directs each of the preference nodes to create the respective portions of the backup based on the information in the backup schedule.

In one embodiment, each of the preference nodes creates its respective backup and transmits this respective backup (with or without its associated metadata) to a target storage system for storage. In one embodiment, at least one of the backup server or the primary node receives a notification from each of the selected preference nodes indicating that the backup of the respective portions was successful. Alternatively, at least one of the backup server or the primary node receives a notification from the target storage service after the entirety of the data has been successfully backed up to the target storage system. In yet an another embodiment, the primary node receives a notification from the backup server after the entirety of the data has been successfully backed up to the target storage system.

The embodiments described herein can be used with an RDBMS that uses SQL—e.g., Microsoft™ SQL Server 2012 or later. In a RDBMS system (such as Microsoft™ SQL Server 2012 or later), creation and configuration of multiple copies of databases is performed using a cluster of nodes that includes a primary node and one or more secondary nodes. At least one of the nodes (e.g., the primary node) houses a primary replica of data (e.g., for read-and-write operations) and the other nodes (e.g., the one or more secondary nodes) house a secondary replica of data (e.g., for read-only operations). In such an RDBMS, these multiple copies can be used for backups. A backup logic or module can leverage these multiple copies from the secondary nodes in the node cluster by providing multiple proxy-based backups. One implementation that includes the use of multiple copies of databases is called the AlwaysOn™ Availability Groups that is part of Microsoft™ SQL Server 2012 or later.

Conventionally, the backup workflow for data associated with a RDBMS system that includes multiple nodes can only be performed consecutively (i.e., one at a time) and not concurrently. Such a backup can lead to wasted resources and a larger backup window. In contrast, the improved backup workflows presented in accordance with the embodiments described herein can assist with enabling data associated with a RDBMS to be backed up concurrently. This is because the improved backup workflows described herein enable the use of multiple nodes during a backup of specified data. In one embodiment, the multiple preference nodes are selected and used for backing up specified data. In one embodiment, the improved backup workflows described herein use multiple proxy/preference nodes within a single availability group to perform a backup of a single set of specified data (hereinafter "single dataset") associated with the single availability group. In another embodiment, the improved backup workflows described herein uses multiple proxy/preference nodes within multiple availability groups to perform a backup of multiple sets of specified data (hereinafter "multiple datasets") associated with the multiple availability groups.

In one embodiment, at least one of the improved backup workflows described herein is configured using a parallel proxy module or logic, which can be implemented as hardware, software, or a combination of both. This parallel proxy module or logic can be used to modify a policy or a configuration file associated with the manner in which backups are performed using one or more availability groups (e.g., AlwaysOn™ Availability Groups of Microsoft™ SQL Server 2012 or later). In one embodiment, the parallel proxy module or logic can be used to customize or configure the policy or configuration file used to determine the improved backup workflows described herein. For example, and in one embodiment, the parallel proxy module or logic enables selection of multiple preference nodes having multiple primary replicas from nodes within a particular AlwaysOn™ Availability Group, as defined by Microsoft™ SQL Server 2012 or later.

FIG. 1 is a block diagram illustrating a storage system 100 capable of performing a backup of data associated with a relational database management system (RDBMS) in accordance with one embodiment. System 100 includes, but is not limited to, node cluster 149, backup server 101, and target storage system 104. Each of the components of system 100 communicate over network 103.

In one embodiment, backup server 101 is responsible for managing backups of multiple storage systems by directing the backing up and restoring of files, folders, databases, and hard drives over a network in order to prevent the loss of data in the event of a hard drive failure, user error, disaster, or accident. Backup server 101 maintains configuration information of storage system 104 and/or node cluster 149, for example, by periodically querying and/or receiving the information from storage system 104 and/or node cluster 149. In one embodiment, backup server 101 manages backups by making requests to the node cluster 149. For example, and in one embodiment, backup server 101 manages backups based on requests to backup data that are received from other clients being operated by users (e.g., a personal computer, etc.). In this example, backup server 101 processes the received requests and makes backup requests to node cluster 149. In this way, backup server 101 acts a system level client that makes requests to backup data on the backend. Alternatively, backup server 101 may be a primary storage system (e.g., local data center) that provides storage to one or more clients, which may periodically back up the content stored therein to a backup storage system (e.g., a disaster recovery site or system), such as target storage system 104. These one or more clients may be any type of client system that includes a server, a host, a personal computer (e.g., desktops, laptops, and tablets), a "thin" client, a personal digital assistant (PDA), a Web enabled appliance, or a mobile phone (e.g., Smartphone), etc. It is to be appreciated that there can be more than one client.

Network 103 may be any type of network, such as a local area network (LAN), a wide area network (WAN) such as the Internet, a fiber network, a storage network, or a combination thereof, wired or wireless. Backup server 101 may be in physical proximity or may be physically remote from client(s), node cluster 149, or target storage system 104. Moreover, each of backup server 101, node cluster 149, and target storage system 104 may be in physical proximity with each other or may be physically remote from each other.

Target storage system 104 may include any type of server or cluster of servers. For example, target storage system 104 may be a storage server used for any of various different purposes, such as to provide multiple users with access to shared data and/or to back up mission critical data. Target storage system 104 may be, for example, a file server (e.g., an appliance used to provide network attached storage (NAS) capability), a block-based storage server (e.g., used to provide storage area network (SAN) capability), a unified storage device (e.g., one which combines NAS and SAN capabilities), a nearline storage device, a direct attached storage (DAS) device, a tape backup device, or essentially any other type of data storage device. Target storage system 104 may have a distributed architecture, or all of its components may be integrated into a single unit. Target storage system 104 may be implemented as part of an archive and/or backup storage system such as a de-duplication storage system available from EMC® Corporation of Hopkinton, Mass. Additional details about target storage system 104 are described below in connection FIG. 8.

Node cluster 149 may include multiple nodes 150 and 151A-C. Each one of nodes 150 and 151A-C can be a computer that includes, but is not limited to, a central processing unit, memory, and a storage device for storing or backing up data (e.g., databases). Node cluster 149 can also include, but is not limited to, any type of server or cluster of servers. For example, node cluster 149 can include a storage server used for any of various different purposes, such as to provide multiple users with access to shared data and/or to back up mission critical data. Node cluster 149 can include, for example, an appliance used to provide NAS capability, an appliance used to provide SAN capability), a unified storage device that combines NAS and SAN capabilities), a nearline storage device, a direct attached storage (DAS) device, a tape backup device, or essentially any other type of data storage device. In one embodiment, node cluster 149 includes primary or master node 150 that directs, viparallel proxy module 121, the backing up of data to or from secondary or slave nodes 151A-C. In one embodiment, backup server 101 also includes parallel proxy module 121 for directing the backing up of data to or from secondary or slave nodes 151A-C via the master node 150. Additional details about node cluster 149 are described below in connection FIG. 8.

In one embodiment of system 100, backup server 101 initiates a backup of data stored in node cluster 149 by providing a backup request to master node 150 of node cluster 149. In response to receiving the request, master node 150 processes the request to determine the data to be backed up. In one embodiment, the data to be backed up can be a single dataset from a single availability group or multiple datasets from multiple availability groups. Such a configuration can be referred to as a configuration of one or more AlwaysOn™ Availability groups.

AlwaysOn™ Availability groups are features of a specific RDBMS called Microsoft™ SQL Server (e.g., Microsoft™ SQL Server 2012 or later). As used herein, an "availability group" and its variations refer to a group of nodes that support a failover environment for a discrete set of user databases that fail over together. For example, master node 150 and secondary nodes 151A-B act as an availability group for a set of user databases (not shown) comprised of three different databases. Each user database that belongs to an availability group is referred to herein as an "availability database." Using the previous example, each of the three different databases are an availability database that belongs to the availability group comprised of master node 150 and secondary nodes 151A-B.

There are two types of availability databases—(i) a "primary database," which is a read-write copy of an availability database; and (ii) a "secondary database," which is a read-only copy of an availability database. Furthermore, an "availability replica" refers to an instantiation of an availability group that is hosted by a specific instance of Microsoft™ SQL Server and that maintains a local copy of each availability database that belongs to the availability group. Generally, there are two types of availability replicas—a single primary replica and no more than eight secondary replicas. An availability replica provides redundancy only at the database level—for the set of databases in one availability group. Each availability replica must reside on a different node of a node cluster. For example, a primary availability replica resides in master node 150 and two secondary availability replicas reside in secondary nodes 151A-B.

As used herein, a "primary replica," a "primary availability replica," and their respective variations refer to the availability replica that makes the primary databases available for read-write connections from clients (e.g., a backup server) and sends transaction log records for each primary database to every secondary replica. A primary replica is not necessarily housed on a master node, which means that a primary replica can be housed in a secondary node.

As used herein, a "secondary replica," a "secondary availability replica," and their respective variations refers to an availability replica that maintains a secondary copy of each availability database, and serves as a potential failover target for the availability group. A secondary replica can also support read-only access to secondary databases and/or creation of backups on secondary databases. A secondary replica is not necessarily housed on a secondary node, which means that a secondary replica can be housed in a master node.

The primary replica makes the primary databases available for read-write connections from clients. In addition, in a process known as data synchronization, which occurs at the database level, the primary replica sends transaction log records of each primary database to every secondary database. Every secondary replica caches the transaction log records (i.e., "hardens the log") and then applies them to its corresponding secondary database. Data synchronization occurs between the primary database and each connected secondary database, independently of the other databases. Therefore, a secondary database can be suspended or fail without affecting other secondary databases, and a primary database can be suspended or fail without affecting other primary databases. The secondary replica(s) can be configured to support read-only access to secondary databases. Furthermore, the secondary replica(s) can be configured to permit backups on secondary databases.

In one embodiment, when the data to be backed up is from a dataset of a single availability group, master node 150 initializes the backup job to secondary nodes 151A-C by selecting one or more preference nodes from secondary nodes 151A-C. For example, and in one embodiment, the preference nodes selected for fulfilling the backup request from backup server 101 are secondary nodes 151A-B. In this embodiment, the designation of primary or secondary replica is irrelevant because the improved backup workflow leverages all of the available replicas to perform the backup. After the selection is complete, the information is provided to at least one of master node 150 or backup server 101. Subsequently, parallel proxy module 121 of at least one of master node 150 or backup server 101 applies a backup algorithm for distributing the dataset-to-be-backed-up of the single availability group among the selected preference nodes. In one embodiment, the dataset-to-be-backed-up of the single availability group is broken up into portions that are each unique. Furthermore, each unique portion is assigned to a respective one of the selected preference nodes for backing up.

The breaking up of the dataset of the single availability group that is to be backed up into several portions can be performed based on a backup algorithm. In one embodiment, the backup algorithm is based on any criteria used for determining the backing up of data. For example, and in one embodiment, the criteria can include at least one of: (i) a backup schedule specified in a backup policy or a configuration file; (ii) a size of the data to be backed up; or (iii) a number of characteristics of the dataset to be backed up (e.g., a number of SQL databases within the dataset to be backed up). In one embodiment, once the dataset of single availability group is broken up in portions and assigned to each of the selected preference nodes 150A-B, then the backup to target storage system 104 is initiated. In one embodiment, each of the selected preference nodes 150A-B creates its respective portion of the backup, sends its respective portion of the backup to target storage system 104, and sends its notification to at least one of backup server 101 or master node 150 independently of operations performed by other ones of preference nodes 150A-B.

In one embodiment, once the backup is completed, each of the selected preference nodes 150A-B sends a backup completion notification to the master node 150, which in turn sends the backup completion notifications to backup server 101. In an alternate embodiment, master node 150 sends a single backup completion notification to backup server 101 after master node 150 receives all the backup completion notifications from the selected preference nodes 150A-B of the availability group. In another alternate embodiment, target storage system 104 sends a single backup completion notification to backup server 101 after the dataset of the single availability group is backed up in target storage system 104.

As explained earlier, master node 150 responds to the backup request based on the dataset to be backed up. In one embodiment, the data to be backed up can be multiple datasets from multiple availability groups. For the sake of clarity and brevity, the following description refers to two datasets from two availability groups to illustrate the backing of multiple sets of data, where each set of data is associated with a unique availability group.

In one embodiment, master node 150 can perform multiple backups of multiple datasets, where each dataset is associated with a unique availability group. In one embodiment, master node 150 performs the multiple backups of the multiple datasets using multiple preference nodes selected from the secondary nodes 151A-C. For example, and in one embodiment, master node 150 can direct a first backup of a first dataset of a first availability group by selecting secondary nodes 151A-B as the preference nodes for this first backup and can direct the concurrent backing up of a second backup of a second dataset of a second availability group by selecting secondary nodes 151B-C as the preference nodes for this second backup. In this example, when secondary node 151B completes its backup of the portion of the first dataset that was assigned to secondary node 151B, then secondary node 151B can proceed to backing up the portion of the second dataset that was assigned to secondary node 151B.

In one embodiment, when there are multiple datasets (i.e., data from two or more availability groups) being backed up, the selected preference nodes from the secondary nodes 151A-C perform all of their backups without regard to the backups being performed by other selected preference nodes of secondary nodes 151A-C. Thus, when secondary node 151A is still in the process of backing up its assigned portion of the first dataset from the first availability group, secondary node 151B is not prevented from moving on to complete the backing up of its assigned portion of the second dataset from the second availability. In other words, master node 150 can initiate multiple backups as soon as the selected preference nodes from the secondary nodes 151A-C are available to perform the backups. This has one advantage of reducing the backup window, given that there is no requirement to wait until all the data from a particular availability group has been completely backed up to proceed with the backing up of data from another availability group. Moreover, by splitting the backing up of data among different preference nodes selected from the secondary nodes 151A-C, the strain on the resources used for backing up the first and second datasets is reduced, which can assist with extending the lifecycle of the storage devices in system 100

In one embodiment, each of selected preference nodes 150A-B creates its respective portion of the backup, sends its respective portion of the backup to target storage system 104, and sends its notification to at least one of backup server 101 or master node 150 independently of operations performed by other ones of preference nodes 150A-B.

In one embodiment, once the backup is completed, each of the selected preference nodes 150A-B sends a backup completion notification to the master node 150, which in turn sends the backup completion notifications to backup server 101. In an alternate embodiment, for each availability group, backup server 101 sends a single backup completion notification to backup server 101 after the data from a set of availability databases of that particular availability group is backed up in target storage system 104. In another alternate embodiment, for each availability group, target storage system 104 sends a single backup completion notification to backup server 101 after the data from a set of availability databases of that particular availability group is backed up in target storage system 104.

Note that some or all of the components as shown and described above (e.g., backup server 101, parallel proxy module/logic 121, and node cluster 149 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 2:
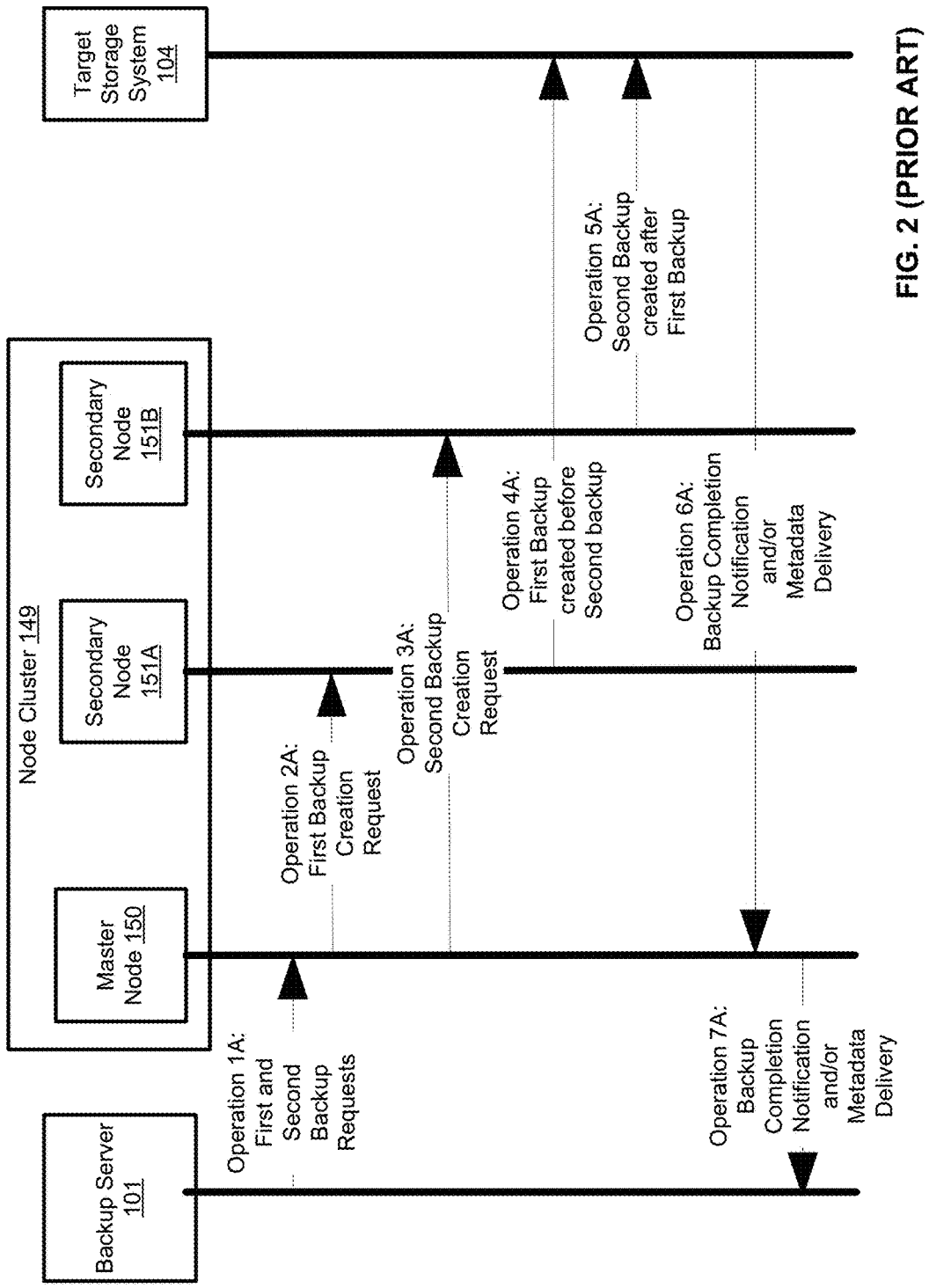
FIG. 2 is transactional diagram illustrating a conventional backup process used by a storage system capable of performing a backup of data associated with an RDBMS according to presently available techniques.

FIG. 2 is transactional diagram illustrating a conventional backup process 200 used by a storage system capable of performing a backup of data associated with an RDBMS according to presently available techniques. It is beneficial to describe this conventional backup process 200 to show how the improved backup workflows described above in connection with FIG. 1 and described below in connection with FIG. 3A, 3B, 4A, 4B, 5, 6, or 7 improve at least one currently-available backup workflow.

The conventional backup process 200 begins with operation 1A, which involves backup server 101 transmitting a first backup request and a second backup request to node cluster 149. Each of the first and second requests are received by the master node 150. In response to receiving the backup request, process 200 performs operation 2A, which involves master node 150 sending the first backup creation request to secondary node 151A. In addition, process 200 proceeds to operation 3A, which involves master node 150 sending the second backup request to secondary node 151B. In response to receiving first backup creation request, at operation 4A, secondary node 151A backs up the data specified in the first backup request to target storage system 104. Only after operation 4A is completed does process 200 proceed to operation 5A, where secondary node 151B backs up the data specified in the second backup request to target storage system 104. At operation 6A of process 200, target storage system 104 communicates a backup completion notification and/or metadata associated with each backup to master node 150 to indicate that the each backup was successful. Furthermore, master node 150 communicates the backup completion notification and/or the metadata associated with each backup to backup server 101 to indicate that the each backup was successful.

In FIG. 2, a conventional RDBMS will select a single node as a preference for backing data that resides in multiple nodes. Thus, regardless of whether another node that includes the specified data will perform the backup more efficiently, the preference node will likely be used. In this situation, the other (more efficient) node will generally only be selected if the preference node is unavailable. In another situation, when there are multiple nodes that can perform the back of the specified data, a system implementing process 200 will make the choice of which one of these node will perform the backup randomly without any consideration of efficiency. Moreover, process 200 backs up data in a sequential manner. More specifically, operations 4A and 5A must be performed consecutively and cannot be performed concurrently. This sequential process can result in a suboptimal backup window and a waste of resources give that the other nodes holding copies of the specified data are not being utilized. Consequently, each of the situations discussed in this paragraph can negatively affect backups by extending the backup window to a suboptimal duration.

In contrast, the embodiments of the improved backup workflows set forth in FIGS. 1 and 3A-7 can assist with performing backups concurrently. Moreover, these embodiments can assist with providing several improvements, as described above in connection with FIG. 1.

Figure 3A:
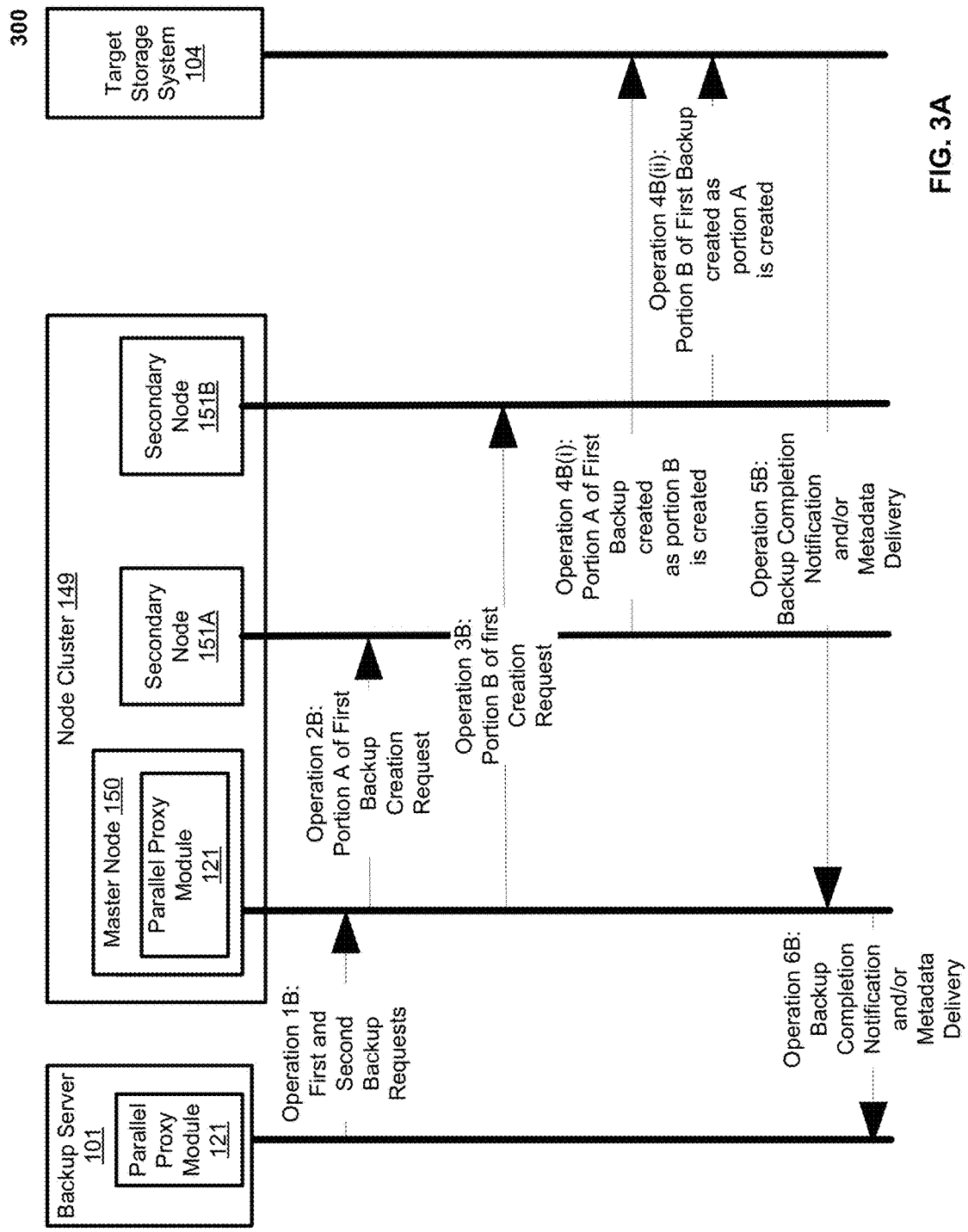
FIGS. 3A-3B make up a transactional diagram illustrating a backup process used by a storage system capable of performing a backup of data associated with an RDBMS according to one embodiment.
Figure 3B:
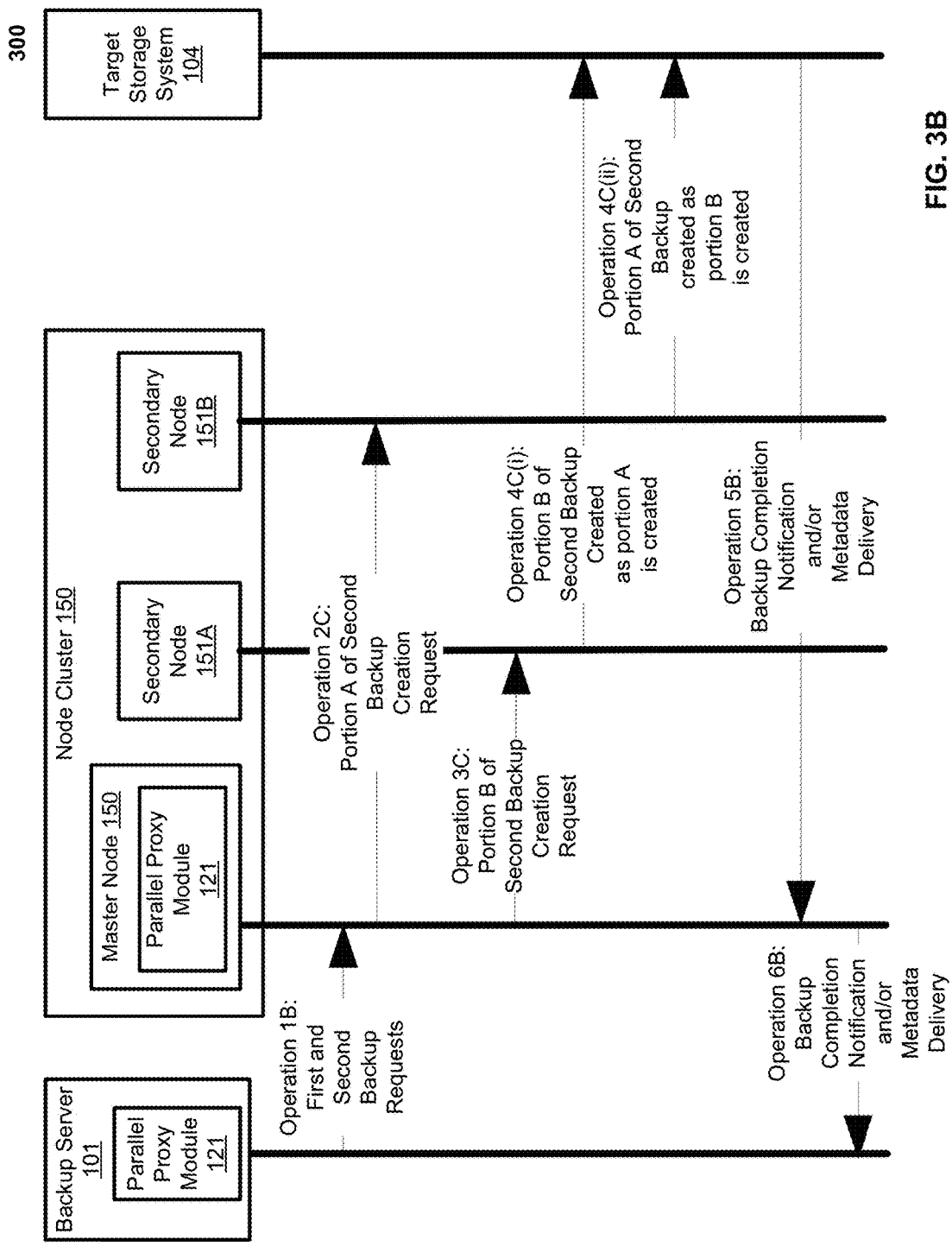

FIGS. 3A-3B make up a transactional diagram illustrating a backup process 300 used by a storage system capable of performing a backup of data associated with an RDBMS according to one embodiment. Backup process 300 is performed by a storage system, such as system 100 that includes at least one parallel proxy module 121. FIG. 3A illustrates operations 1B-6B of process 300 and FIG. 3B illustrates operations 1B, 2C-4C(ii), and 6B of process 300.

Backup process 300 is one embodiment of a process that can assist with improving the currently available backup process 200, which is described above. In one embodiment, process 300 begins with operation 1B, which involves backup server 101 transmitting a first backup request and a second backup request to master node 150.

In one embodiment, backup server 101 and master node 150 work together to determine how to distribute the backing up of the data specified in the first request between secondary nodes 151A-B. In one embodiment, parallel proxy module 121 of backup server 101 makes the determination of how to distribute the backing up of the data specified in the first request between secondary nodes 151A-B and the determined distribution is passed along to master node 150 along with the first and second request in operation 1B. In an alternate embodiment, parallel proxy module 121 of master node 150 makes the determination of how to distribute the backing up of the data specified in the first request between secondary nodes 151A-B.

Parallel proxy module 121, which can reside in at least one of backup server 101 or the master node 150, processes at least one of preference database information, policy configuration information, or cluster configuration information. In one embodiment, a configuration file includes at least one of the preference database information, the policy configuration information, or the cluster configuration information. In one embodiment, parallel proxy module 121 processes the preference database information to identify those nodes of an availability group that can function as preference nodes. For example, parallel proxy module 121 processes the preference database information to select secondary nodes 151A-B as preference nodes from a group of secondary nodes 151A-C.

Parallel proxy module 121 can process the policy configuration information to modify a policy for performing a backup so that the backup is performed in accordance with at least one of the embodiments described herein (e.g., process 300, system 100, etc.). In one embodiment, the policy configuration information includes a backup schedule specifying a preference for backing specified data. For example, and in one embodiment, the backup schedule could specify that a particular type of data should be backed up at a specific time. Thus, any other data being backed up at that time will be paused until the backup of specified data is completed. In one embodiment, the policy configuration information enables configuration of an availability group comprised of master node 150 and secondary nodes 151A-B to specify that each secondary node in the availability group is a preference node for performing backups. In addition, the policy configuration information can be used to ensure that the RDBMS enforces the specified preference nodes. In an alternate embodiment, the policy configuration information enables configuration of an availability group comprised of master node 150 and secondary nodes 151A-B to specify that only those secondary nodes in the availability group whose central processing units are capable of a certain amount of data processing can be preference nodes for performing backups.

Parallel proxy module 121 processes cluster configuration information, which includes a backup algorithm that utilizes the policy configuration information and the preference database information, to determine an efficient way to backup the specified data. For example, and in one embodiment, parallel proxy module 121 uses the backup algorithm to determine how to distribute a backup among multiple preference nodes 151A-B based on the policy configuration information, the preference database information, and weights assigned to at least one of the (i) a backup schedule specified in a backup policy or a configuration file; (ii) a size of the data to be backed up; or (iii) a number of characteristics of the dataset to be backed up (e.g., a number of SQL databases within the dataset to be backed up). In one embodiment, the weights of the backup algorithm can be set by a user via inputs provided to parallel proxy module 121.

In one embodiment, and in response to master node 150 receiving the first and second backup requests, process 300 proceeds to operation 2B. In this embodiment, operation 2B involves master node 150 sending, to secondary node 151A, portion A of the data specified in the first backup creation request. Moreover, in response to master node 150 receiving the first and second backup requests, process 300 proceeds to operation 3B. Operation 3B, in one embodiment, involves portion B of the data specified in the first backup creation request. Parallel proxy module 121 can perform at least one of operation 2B or operation 3B. In one embodiment, each of operations 2C and 3C are based on the processing of information performed by parallel proxy module 121 as described above.

Process 300 proceeds to operation 4B, which includes operations 4B(i) and 4B(ii). In one embodiment, secondary node 151A performs operations 4B(i) at the same time that secondary node 151B performs operation 4B(ii). Thus, portions A and B of the data specified in the first backup request are backed up to target storage system 104 concurrently. This can assist with reducing the backup window. This can also assist with load balancing the work performed by each of nodes 151A-B given that each node 151A-B performs only a subset of the backup.

In one embodiment, each of nodes 150 and 151A-B are part of the same availability group. In this way, the specified data of the first request (e.g., a database) will be stored (as replicas) on each node in the availability group—i.e., master node 150, secondary node 151A, and secondary node 151B. Thus, the portions A and B make up the same specified data in the first request even though each portion A and B originates from a different preference node 151A-B.

In one embodiment, and at operation 5B, at least one of secondary node 151A or target storage system 104 provides a backup completion notification and/or metadata associated with the backed up portion to master node 150 after operation 4B(i) is completed. In one embodiment, and at operation 5B, at least one of secondary node 151B or target storage system 104 provides a backup completion notification and/or metadata associated with the backed up portion to master node 150 after operation 4B(ii) is completed. In an alternate embodiment, and at operation 5B, target storage system 104 provides a backup completion notification and/or metadata associated with the backed up data to master node 150 after the both operation 4B(i) and 4B(ii) are completed.

Process 300 proceeds to operation 6B, which involves master node 150 communicating the backup completion notification and/or metadata associated with the backed up data to backup server 101. In this way, operation 6B can assist facilitating the improvements described above in connection with FIG. 1.

With regard to FIG. 3B, which describes the second backup request, at least one of master node 150 or backup server 101 (via parallel proxy module 121) determines how to distribute the backup of the data specified in the second request. Parallel proxy module 121 makes this determination in accordance with at least one of the embodiments described above. In one embodiment, and in response to master node 150 receiving the first and second backup requests, process 300 proceeds to operation 2C. In this embodiment, operation 2C involves master node 150 sending, to secondary node 151B, portion A of the data specified in the second backup creation request. Moreover, in response to master node 150 receiving the first and second backup requests, process 300 proceeds to operation 3C. Operation 3C, in one embodiment, involves master node 150 communicating portion B of the data specified in the second backup creation request to secondary node 151A. Parallel proxy module 121 can perform at least one of operation 2C or operation 3C. In one embodiment, each of operations 2C and 3C are based on processing of information performed by parallel proxy module 121 as described above.

Process 300 proceeds to operation 4C, which includes operations 4C(i) and 4C(ii). In one embodiment, node 151B performs operations 4C(i) at the same time that node 151A performs operation 4B(ii). Thus, portions A and B of the data specified in the second backup request are backed up to target storage system 104 concurrently. This can assist with reducing the backup window. This can also assist with load balancing the work performed by each of nodes 151A-B given that each node 151A-B performs only a subset of the backup of the data specified in the second request.

In one embodiment, each of nodes 150 and 151A-B are part of the same availability group. In this way, the specified data of the second request (e.g., one or more databases) will be stored (as replicas) on each node in the availability group—i.e., master node 150, secondary node 151A, and secondary node 151B. Thus, portions A and B make up the same specified data in the second request even though each portion A and B originates from a different preference node 151A-B. In one embodiment, and at operation 5B, at least one of secondary node 151B or target storage system 104 provides a backup completion notification and/or metadata associated with the backed up portion to master node 150 after operation 4C(i) is completed. In one embodiment, and at operation 5B, at least one of secondary node 151A or target storage system 104 provides a backup completion notification and/or metadata associated with the backed up portion to master node 150 after operation 4C(ii) is completed. In an alternate embodiment, and at operation 5B, target storage system 104 provides a backup completion notification and/or metadata associated with the backed up data to master node 150 after the both operation 4C(i) and 4C(ii) are completed.

Process 300 proceeds to operation 6B, which involves master node 150 communicating the backup completion notification and/or metadata associated with the backed up data to backup server 101. In this way, operation 6B can assist facilitating the improvements described above in connection with FIG. 1.

In FIGS. 3A-3B, parallel proxy module 121 enables modification of backup workflow associated with an RDBMS, which results in backing up data concurrently using multiple preference nodes selected from a cluster of nodes. In one situation, when there are multiple nodes that can perform the back of the specified data, a system implementing process 300 will identify and select the preference nodes for backing up the data based on information processed by a backup algorithm. This can assist with making intelligent backups based on capabilities of each node in a node cluster. Furthermore, the backup algorithm can be applied dynamically to ensure that backups adapt to changing circumstances in a system implementing process 300. In addition, process 300 backs up data in a concurrent manner—i.e., non-sequential manner. More specifically, operations 4B and 4C can be performed concurrently, so long the nodes 151A are capable of performing the backup. This non-sequential process can assist with improving the backup window and with preventing a waste of resources give that the other nodes holding copies of the specified data can be utilized in the backup process. Thus, process 300 can assist with resolving some of negative effects of the conventional process 200 that is described above.

Figure 4A:
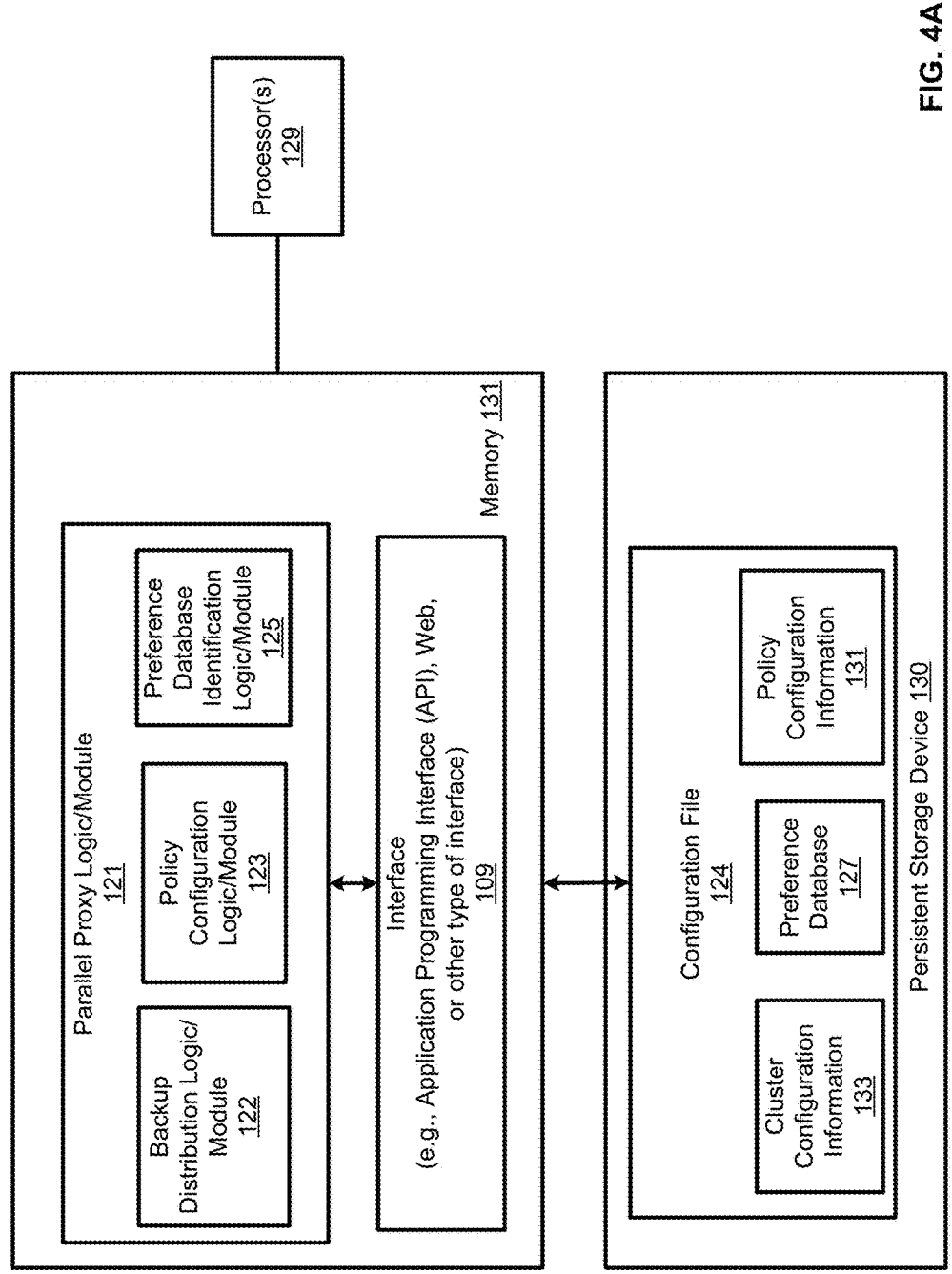
FIG. 4A is block diagram illustrating a storage system that includes a parallel proxy logic or module for performing a backup of data associated with an RDBMS according to one embodiment.

FIG. 4A is block diagram illustrating a data storage system 400 that includes a parallel proxy logic/module 121 for performing a backup of data associated with an RDBMS according to one embodiment. FIG. 4A provides additional details about the storage system of FIG. 1. The description provided in connection with storage system 400 may be applied to at least one of node cluster 149, target storage system 104, or backup server 101. It is to be appreciated that certain details have been omitted from the system 400 of FIG. 4A in order to avoid obscuring the inventive concepts described herein.

In one embodiment, data storage system 400 includes parallel proxy logic/module 121 configured to perform an improved process for backing up data associated with an RDBMS according to one embodiment. In one embodiment, the performance of the improved process is triggered based on requests from a client (e.g., from backup server 101). In one embodiment, parallel proxy logic/module 121 is implemented and executed by one or more processor(s) 129 in memory 131. As a first example, and in one embodiment, parallel proxy logic/module 121 is implemented and executed by one or more processor(s) 129 in memory 131 and memory 131 resides in or is associated with backup server 101. As a second example, and in one embodiment, parallel proxy logic/module 121 is implemented and executed by one or more processor(s) 129 in memory 131 and memory 131 resides in or is associated with primary node 150 of FIG. 1. As a third example, and in one embodiment, parallel proxy logic/module 121 is implemented and executed by one or more processor(s) 129 in memory 131 and memory 131 resides in or is associated with one or more of secondary nodes 151A-C of FIG. 1.

In one embodiment, parallel proxy logic/module 121 includes a backup distribution logic/module 122, a policy configuration logic/module 123, and a preference database identification logic/module 125, each of which are described in further detail below.

Data storage system 100 further includes interface 109, which can be executed by one or more processors in memory 131. Interface 109 may be an application programming interface (APIs) or a plugin interface. In one embodiment, parallel proxy logic/module 121 accesses configuration file 124 via interface 109. In one embodiment, configuration file 124 is stored in storage device 130. In one embodiment, parallel proxy logic/module 121 communicates with cluster configuration 133, the preference database 127, and policy configuration 131 that is stored in storage device 130. Additional details about each of cluster configuration information 133, the preference database 127, and policy configuration information 131 are described below.

In one embodiment, parallel proxy logic/module 121 accesses configuration file 124 to obtain preference database information found in preference database 127, which enables a computing system (e.g., at least one of backup server 101 and master node 150 of FIG. 1) to identify those nodes of an availability group that can function as preference nodes. Preference database 127 can include, but is not limited to, information about an availability group and a node status of each node within that group. For example, preference database information can include information regarding the number of secondary nodes in an availability group that are currently available for a backup in accordance with a particular request. Preference database information is described above in connection with at least one of FIG. 1, 3A, or 3B. The information 127, 131, and/or 133 may be configured by an administrator or alternatively, receive from backup server 101 over a network (e.g., network 103).

In one embodiment, parallel proxy logic/module 121 accesses file 124 to obtain policy configuration information 127, which enables a computing system (e.g., at least one of backup server 101 and master node 150 of FIG. 1) to modify the policy for performing a backup so that the backup is performed in accordance with at least one of embodiments described above (e.g., process 300, system 100, etc.). Policy configuration information, can include, but is not limited to rules for selecting and enforcing preference nodes. Policy configuration information is described above in connection with at least one of FIG. 1, 3A, or 3B.

In one embodiment, parallel proxy logic/module 121 accesses file 124 to obtain cluster configuration information 133, which enables a computing system (e.g., at least one of backup server 101 and master node 150 of FIG. 1) to that utilize a backup algorithm in combination with the policy configuration information 131 and the preference database information 127 to determine an efficient way to back up the specified data in accordance with at least one of embodiments described above (e.g., process 300, system 100, etc.). Cluster configuration information can include, but is not limited to, weights assigned to at least one of the (i) a backup schedule specified in a backup policy or a configuration file; (ii) a size of the data to be backed up; or (iii) a number of characteristics of the dataset to be backed up (e.g., a number of SQL databases within the dataset to be backed up). Cluster configuration information is described above in connection with at least one of FIG. 1, 3A, or 3B.

As explained earlier, parallel proxy logic/module 121 can include a backup distribution logic/module 122, a policy configuration logic/module 123, and a preference database identification logic/module 125. In one embodiment, policy configuration logic/module 123 processes policy configuration information 127 to modify the policy for performing a backup so that the backup is performed in accordance with at least one of embodiments described above (e.g., process 300, system 100, etc.). In a further embodiment, the output of the policy configuration logic/module 123 is provided to the backup distribution logic/module 122, which is described below. Furthermore, and in one embodiment, preference database identification logic/module 125 processes preference database information found in preference database 127 to identify those nodes of an availability group that can function as preference nodes. In a further embodiment, the output of the preference database identification logic/module 125 is provided to the backup distribution logic/module 122, which is described below.

In one embodiment, the backup distribution logic/module 122 processes cluster configuration information 133 obtained from file 124 to process a backup algorithm in combination with the information received from policy configuration logic/module 123 and preference database identification logic/module 125. In one embodiment, the backup distribution logic/module 122 processes the information described above to determine an efficient way to backup the specified data in accordance with at least one of embodiments described above (e.g., process 300, system 100, etc.).

Figure 4B:
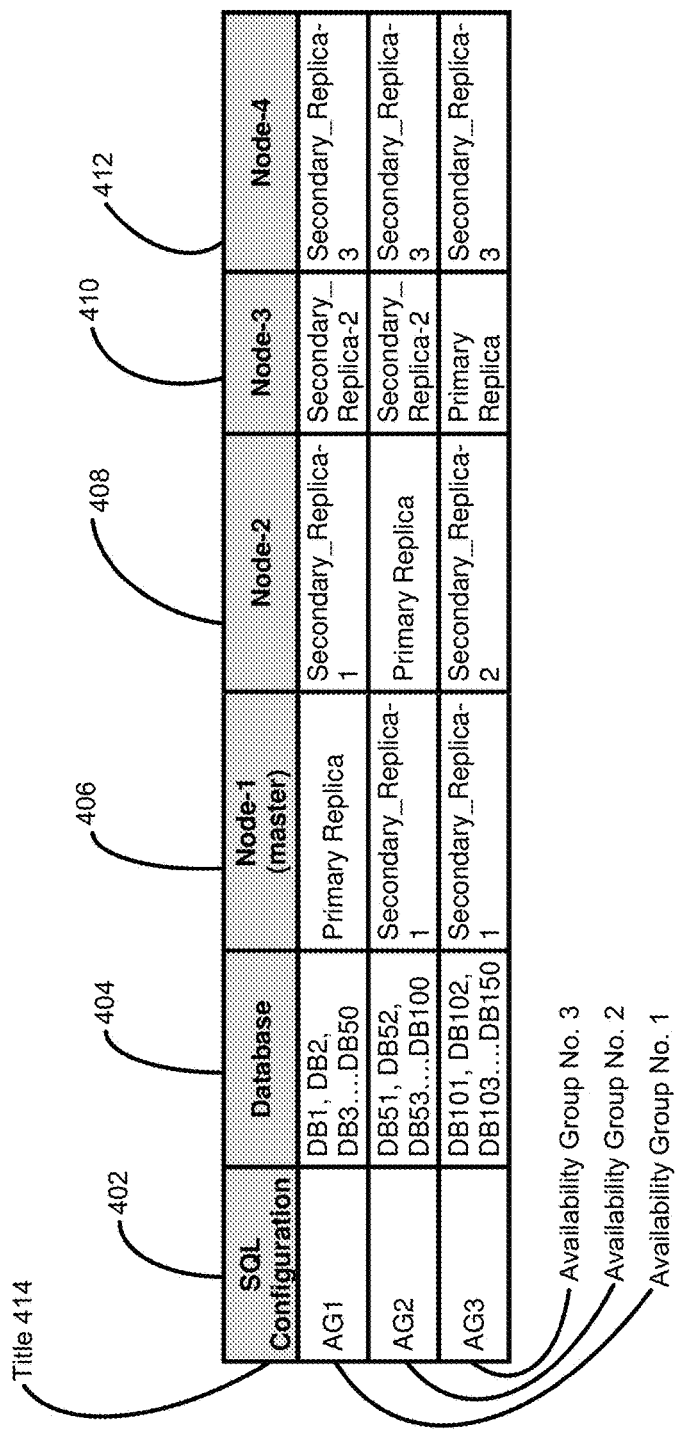
FIG. 4B is a data structure illustrating information within a configuration file (such as the configuration file of FIG. 4A) that is used for performing a backup of data associated with an RDBMS according to one embodiment.

FIG. 4B is a data structure (e.g., a table) illustrating information within a configuration file (such as the configuration file 124 of FIG. 4A) that is used for performing a backup of data associated with an RDBMS according to one embodiment. As shown in file 124 of FIG. 4B, there are six columns and four rows. The first row 414 designates the title of each column 402, 404, 406, 408, 410, and 412. The first column 402 includes the Structured Query Language (SQL) configuration—i.e., the availability groups that include specified sets of data. In one embodiment, file 124 includes multiple availability groups, with each group including a distinct set of data. For example, and as shown in FIG. 4B, file 124 has three different availability groups: (i) availability group no. 1 (AG1); (ii) availability group no. 2(AG2); and (iii) availability group no. 3 (AG3). The second column 404 specifies the data stored in each of AG1 AG2, and AG3. For example, and in one embodiment, the data stored in the availability group of file 124 are SQL databases. More specifically, and as shown in FIG. 4B, AG1 stores fifty databases designated DB1-DB50, AG2 stores fifty databases designated DB51-DB100, and AG3 stores fifty databases designated DB101-DB150. It is to be appreciated that the data stored in availability groups can vary and the distribution of data between availability groups does not have to be equal or symmetric. For example, and not by way of limitations, AG1 can have 20 databases, AG1 can be 100 databases, and AG3 can have 73 databases.

Each of the availability groups shown in FIG. 4B is comprised of four nodes, as shown by columns 406, 408, 410, and 412. Column 406 indicates that the first node is the master or primary node for the node cluster made up four nodes, as shown in FIG. 4B. In one embodiment, and as explained above, the primary node directs the backing up of data to or from the secondary nodes. For example, the secondary nodes shown in columns 408, 410, and 412.

File 124 of FIG. 4B shows that each of the availability groups has one primary replica and three secondary replicas. In AG1, the primary replica resides in the master node (column 406), while the secondary replicas reside in the secondary nodes (columns 408, 410, and 412). In AG2, the primary replica resides in the first secondary node (column 408), while the secondary replicas reside in the master node (column 406), the second secondary node (column 410), and the third secondary node (column 412). In AG3, the primary replica resides in the second secondary node (column 410), while the secondary replicas reside in the master node (column 406), the first secondary node (column 408), and the third secondary node (column 412).

As explained above in connection with at least one of FIG. 1, 3A, 3B, or 4A, the configuration file 124 of FIG. 4B is processed by parallel proxy module 121 to cause a data storage system (e.g., system 100 of FIG. 1) to perform at least one of the improved backup workflows described herein.

Figure 5:
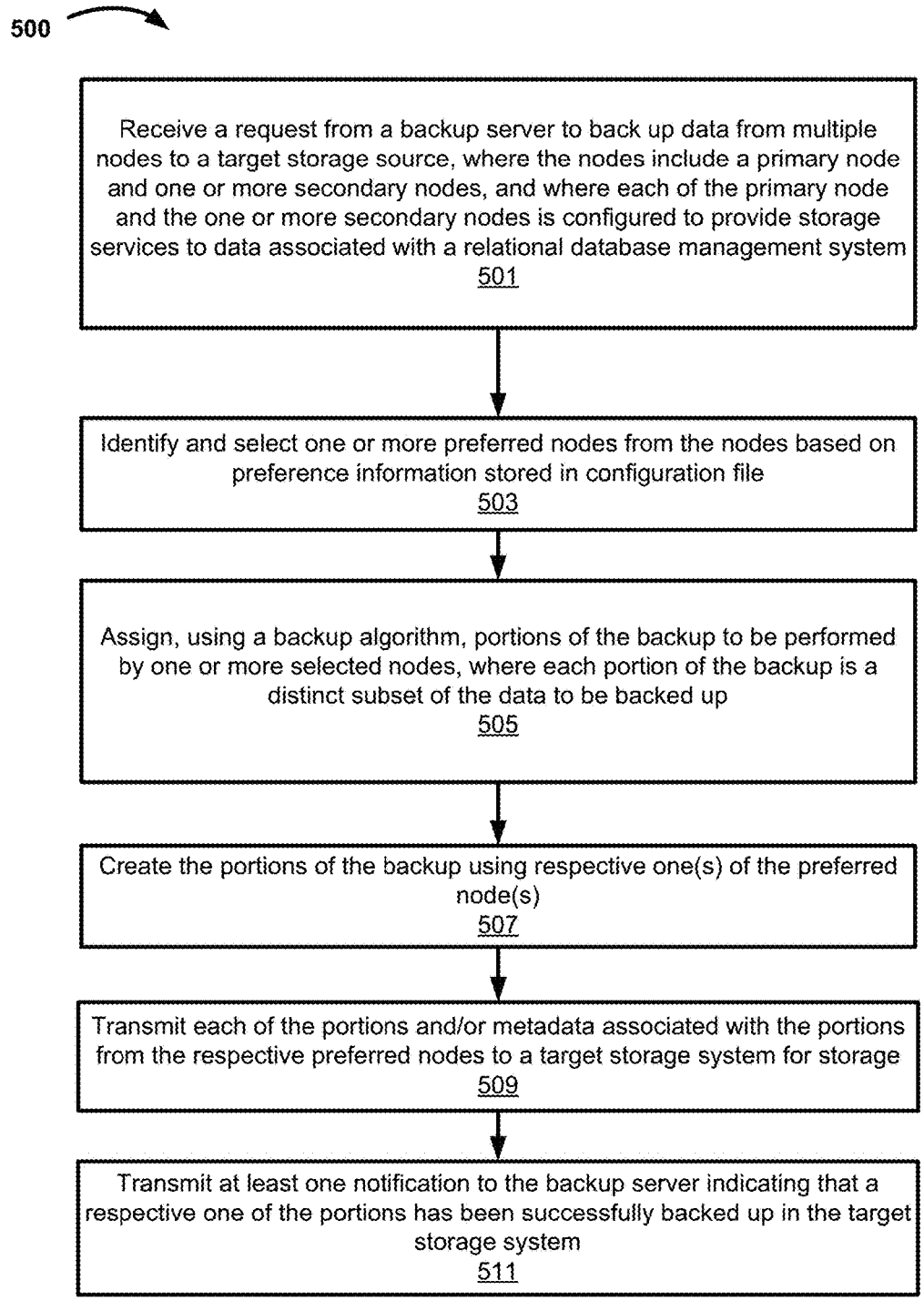
FIG. 5 is flowchart diagram illustrating a process of backing up data according to one embodiment.

FIG. 5 is flowchart diagram illustrating a process 500 of backing up data according to one embodiment. Process 500 is performed by a storage system, such as system 100 that includes at least one parallel proxy module 121. In one embodiment, process 500 is performed by at least one of hardware, software, or a combination of both, as described above in connection with at least one of FIG. 1, 3A, 3B, 4A, or 4B. In a particular embodiment, process 500 may be performed by parallel proxy module 121, which is described in connection with at least one of FIG. 1, 3A, 3B, 4A, or 4B.

Process 500 begins at block 501, where a request to back up data from multiple nodes to a target storage source is received at a node cluster. In one embodiment, the request is sent from a backup server to a primary node of the node cluster. In one embodiment, the multiple nodes are communicatively coupled to the backup server, which manages backups of one or more storage devices. In one embodiment, the multiple nodes include the primary node and one or more secondary nodes, and each of the primary node and the one or more secondary nodes is configured to provide storage services to data associated with a relational database management system (RDBMS). In one embodiment, the receiving of the request to back up data from multiple nodes to a target storage source is performed in accord with the description provided above in connection with at least one of FIG. 1, 3A, 3B, 4A, or 4B.

Process 500, at block 503, includes identifying and selecting at least one preference node from the multiple nodes. In one embodiment, the identification and the selection of the preference node(s) is based on information stored in a configuration file. In one embodiment, the identification and the selection of preference node(s) is performed in accordance with the description provided above in connection with at least one of FIG. 1, 3A, 3B, 4A, or 4B. Process 500 proceeds to block 505, where portions of the backup to be performed are assigned to the selected preference node(s) using a backup algorithm. In one embodiment, each portion of the backup is a distinct subset of the data to be backed up and each of the preference node(s) is assigned a unique portion of the backup. In one embodiment, the assignment of preference node(s) to backup specified portions of the data is performed in accord with the description provided above in connection with at least one of FIG. 1, 3A, 3B, 4A, or 4B.

At block 507, process 500 includes creating the portions of the backup using respective preference node(s). The creation of the backup portions, at block 507, can be performed in accord with the description provided above in connection with at least one of FIG. 1, 3A, 3B, 4A, or 4B. At block 509, process 500 includes transmitting each of the portions and/or metadata associated with the portions from the respective preference nodes to a target storage system for storage. In one embodiment, the transmission of the portions and/or associated metadata is performed in accordance with the description provided above in connection with at least one of FIG. 1, 3A, 3B, 4A, or 4B.

Process 500, at block 511, communicates one or more notifications to the backup server. In one embodiment, each notification indicates that a respective one of the portions has been successfully backed up in the target storage system. In one embodiment, the transmission of backup completion notification(s) is performed in accordance with the description provided above in connection with at least one of FIG. 1, 3A, 3B, 4A, or 4B.

Figure 6:
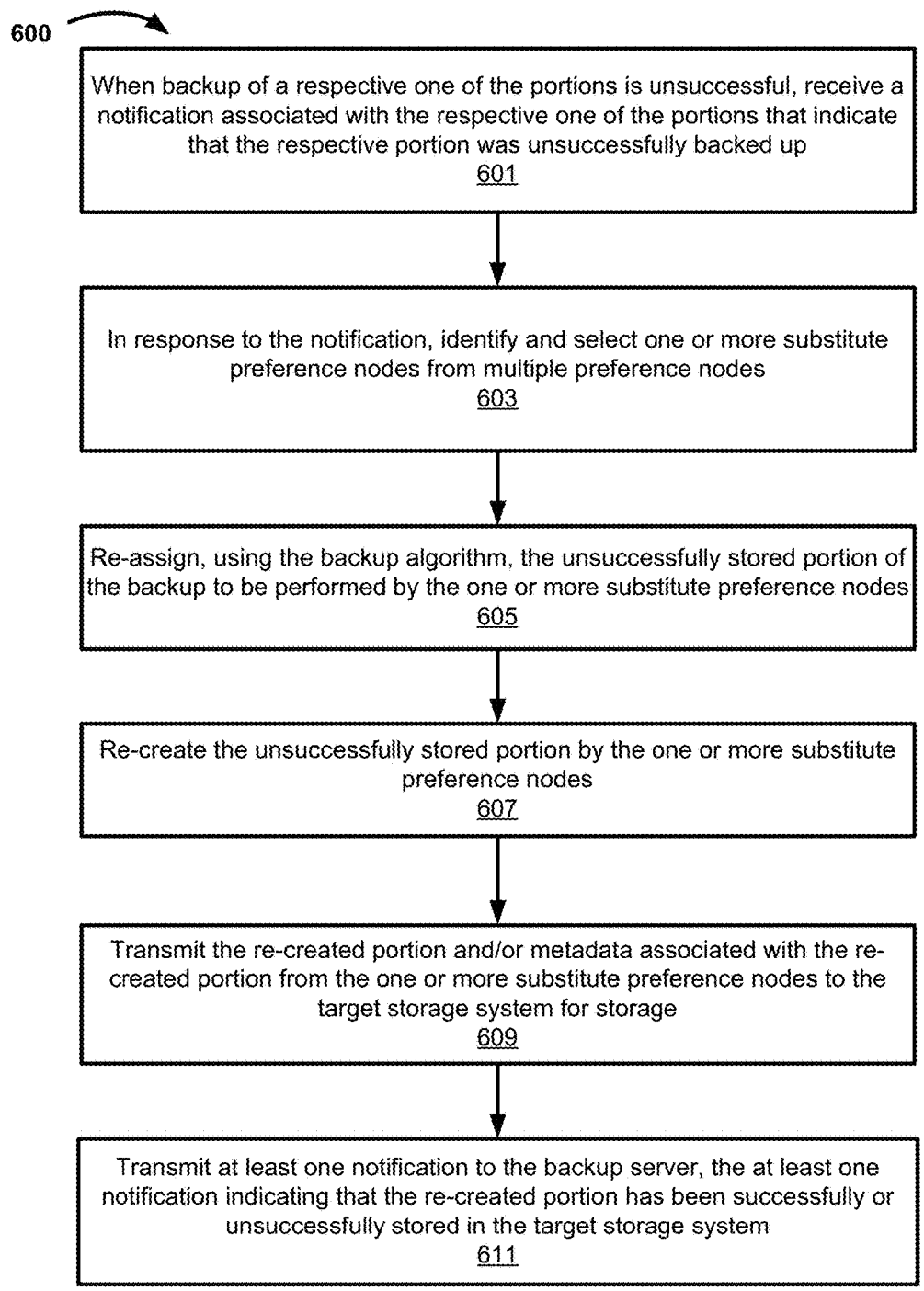
FIG. 6 is flowchart diagram illustrating a process of backing up a portion of data associated with an RDBMS according to one embodiment when a previous backup of that portion of the backup was unsuccessful in accordance with one embodiment.

FIG. 6 is flowchart diagram illustrating a process 600 of backing up a portion of data associated with an RDBMS according to one embodiment when a previous backup of that portion of the backup was unsuccessful in accordance with one embodiment. Process 600 is performed by a storage system, such as system 100 that includes at least one parallel proxy module 121. In one embodiment, process 600 is performed by at least one of hardware, software, or a combination of both, as described above in connection with at least one of FIG. 1, 3A, 3B, 4A, 4B, or 5. In a particular embodiment, process 600 may be performed by parallel proxy module 121, which is described in connection with at least one of FIG. 1, 3A, 3B, 4A, 4B, or 5.

Process 600 begins at block 601, where a notification associated with a respective one of the portions indicates that the respective portion was unsuccessfully backed up. In one embodiment, the notification is sent from at least one of a target storage system or a primary node to a backup server. In an alternate embodiment, the notification is sent from a target storage system to a primary node. In one embodiment, process 600 begins after block 511 of FIG. 5 in response to a backing up of a portion of the specified data being unsuccessful.

Process 600, at block 603, includes identifying and selecting at least one substitute preference node from the multiple nodes. In one embodiment, the identification and the selection of the substitute preference node(s) is based on information stored in a configuration file. In one embodiment, the identification and the selection of substitute preference node(s) is similar to or the same as the identification and the selection of preference node(s), which is described above in connection with at least one of FIG. 1, 3A, 3B, 4A, 4B, or 5. Process 600 proceeds to block 605, where the unsuccessfully stored portion of the backup is re-assigned to the selected substitute preference node(s) using a backup algorithm. In one embodiment, the re-assignment of the unsuccessfully stored portion of the backup to the selected substitute preference node(s) is similar to or the same as the assignment of preference node(s) to backup specified portions of the data, which is described above in connection with at least one of FIG. 1, 3A, 3B, 4A, 4B, or 5.

At block 607, process 600 includes re-creating the portions of the backup using the respective substitute preference node(s). The re-creation of the backup, at block 607, can be performed in accord with the description provided above in connection with at least one of FIG. 1, 3A, 3B, 4A, 4B, or 5. At block 609, process 600 includes transmitting the re-created portion and/or metadata associated with the re-created portion from the respective substitute preference node(s) to a target storage system for storage. In one embodiment, the transmission of the re-created portion and/or associated metadata is similar to or the same as the transmission of the created portions and/or associated metadata, which is described above in connection with at least one of FIG. 1, 3A, 3B, 4A, 4B, or 5.

Process 600, at block 611, communicates one or more notifications to the backup server. In one embodiment, each notification indicates that a respective one of the re-created portions has been successfully backed up in the target storage system. In one embodiment, the transmission of backup completion notification(s) is performed in accordance with the description provided above in connection with at least one of FIG. 1, 3A, 3B, 4A, 4B, or 5.

Figure 7:
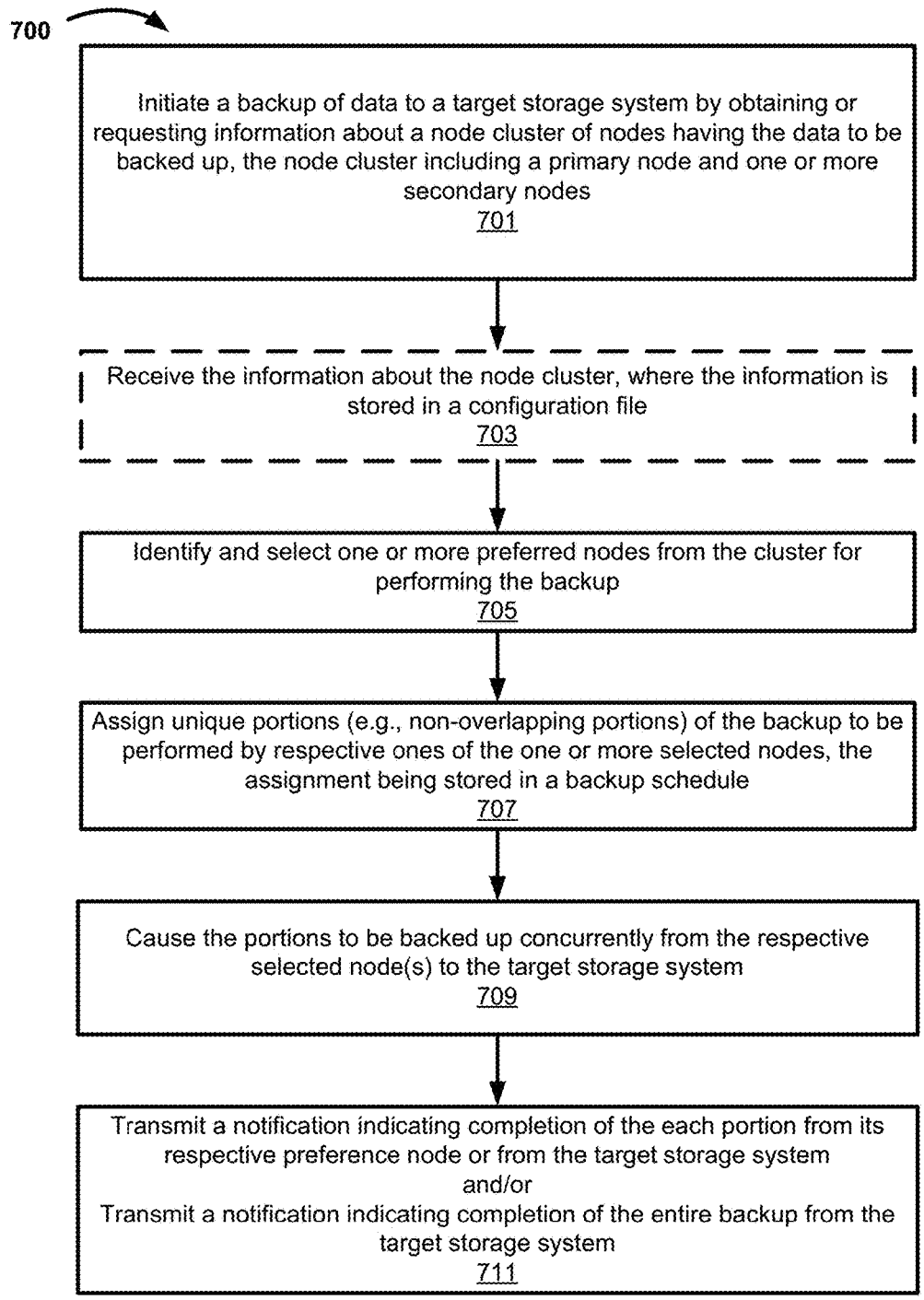
FIG. 7 is flowchart diagram illustrating a process of backing up data associated with an RDBMS according to another embodiment.

FIG. 7 is flowchart diagram illustrating a process 700 of backing up data associated with an RDBMS according to another embodiment. Process 700 is performed by a storage system, such as system 100 that includes at least one parallel proxy module 121. In one embodiment, process 700 is performed by at least one of hardware, software, or a combination of both, as described above in connection with at least one of FIG. 1, 3A, 3B, 4A, 4B, 5, or 6. In a particular embodiment, process 700 is performed by parallel proxy module 121, which is described in connection with at least one of FIG. 1, 3A, 3B, 4A, 4B, 5, or 6.

Process 700 begins at block 701, where a backup of data to a target storage system is initiated by obtaining or requesting information about a node cluster of nodes having the data to be backed up. In one embodiment, the node cluster includes a primary node and one or more secondary nodes. In one embodiment, each node includes a replica of the data. In one embodiment, the primary node is configured to control the one or more secondary clusters to perform the backup. In one embodiment, the replica can be a primary replica or secondary replica.

At block 703, process 300 optionally includes receiving the requested information. In one embodiment, a backup server that includes the parallel proxy module might request the information from a primary node with the parallel proxy module, and vice versa. In this way, the backup server and the primary node work together to initiate the backup. Block 703 is optional because the information may not need to requested, and is instead obtained from a configuration file stored within the backup server or the master node. In one embodiment, each of blocks 701 and 703 is performed in accordance with the description provided above in connection with at least one of FIG. 1, 3A, 3B, 4A, 4B, 5, or 6.

Process 700, at block 705, includes identifying and selecting at least one preference node from the multiple nodes. In one embodiment, the identification and the selection of the preference node(s) is based on information stored in a configuration file. In one embodiment, the identification and the selection of preference node(s) is similar to or the same as the identification and the selection of preference node(s), which is described above in connection with at least one of FIG. 1, 3A, 3B, 4A, 4B, 5, or 6. Process 700 proceeds to block 707, where portions of the backup are assigned to the selected preference node(s) using a backup algorithm. In one embodiment, the assignment of portions of the backup to the selected preference node(s) is similar to or the same as the assignment of preference node(s) to backup specified portions of the data, which is described above in connection with at least one of FIG. 1, 3A, 3B, 4A, 4B, 5, or 6.

At block 709, process 700 includes backing up the assigned portions of the backup using the respective preference node(s). In one embodiment, the backing up of the assigned portions is directed by the primary node, based a processing of information within the configuration file. The backup, at block 709, can be performed in accord with the description provided above in connection with at least one of FIG. 1, 3A, 3B, 4A, 4B, 5, or 6. At block 711, process 700 includes transmitting each of the portions and/or metadata associated with the portions from the respective preference node(s) to a target storage system for storage. In one embodiment, the transmission is similar to or the same as the transmission of the portions and/or associated metadata, which is described above in connection with at least one of FIG. 1, 3A, 3B, 4A, 4B, 5, or 6.

Process 700, at block 711, communicates a notification indicating completion of the each portion from its respective preference node or from the target storage system. In a further embodiment, process 700 includes communicating a notification indicating completion of the entire backup from the target storage system. In one embodiment, the transmission of backup completion notification(s) is performed in accordance with the description provided above in connection with at least one of FIG. 1, 3A, 3B, 4A, 4B, 5, or 6.

Figure 8:
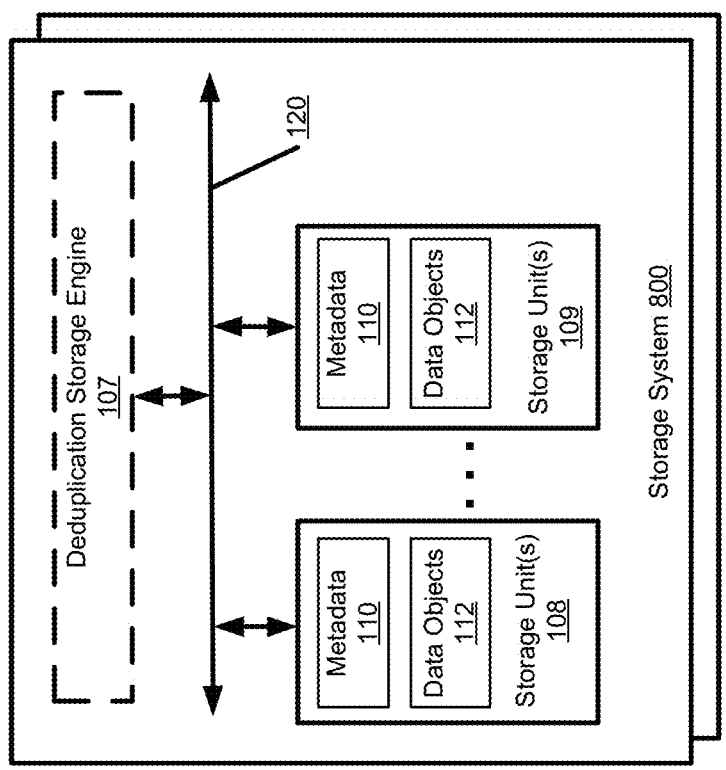
FIG. 8 is a block diagram of a storage system illustrating additional details about at least one of the target storage system or the node cluster set forth in FIG. 1 in accordance with one of the embodiments described herein.

FIG. 8 is a block diagram illustrating a storage system 800 that may represent at least one of target storage system 104 or node cluster 149, both of which are set forth in FIG. 1 in accordance with one of the embodiments described herein. The components of system 800 described in connection with FIG. 8 can be included in at least one of target storage system 104 or node cluster 149.

Storage system 800 may include or represent any type of server or a cluster of one or more servers (e.g., cloud servers). For example, storage system 800 may be a storage server used for various different purposes, such as to provide multiple users or client systems with access to shared data and/or to back up (or restore) data (e.g., mission critical data). Storage system 800 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 800 may further provide storage services via an object-based protocol and Hadoop distributed file system (HDFS) protocol.

In one embodiment, storage system 800 includes at least one of deduplication logic 107, one or more storage units or devices 108, or one or more cache memory devices 109 (also referred to as cache or cache devices). In one embodiment, each of deduplication logic 107, storage unit(s) 108, and cache device(s) 109 may be implemented in software, hardware, or a combination thereof. In one embodiment, at least two of deduplication logic 107, storage unit(s) 108, or cache device(s) 109 is communicatively coupled to each other.

In one embodiment, storage unit(s) 108-109 or cache device(s) 114 may be implemented locally (e.g., single node operating environment) or remotely (e.g., multi-node operating environment) via interconnect 120, which may be a bus and/or a network (e.g., a storage network or a network similar to network 103). Storage unit(s) 108-109 may include a single storage device such as a hard disk, a tape drive, a semiconductor memory, one or more storage devices such as a redundant array system (e.g., a redundant array of independent disks (RAID)), a system for storage such as a library system or network attached storage system, or any other appropriate storage device or system.

Storage units 108 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108 may also be combinations of such devices. In the case of disk storage media, the storage units 108 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding; a reference to a segment plus a difference; etc.). In one embodiment, different storage units may use different compression methods (e.g., main or active storage unit from other storage units, one storage unit from another storage unit, etc.).

In one embodiment, cache device(s) 114 include at least one of a volatile memory device or a non-volatile memory device. For example, and in one embodiment, cache device(s) 114 can be a non-volatile memory device such as a solid state drive (SSD), a flash memory device, a flash-based memory device, a peripheral component interconnect express (PCIe) connected flash memory, solid state device (SSD), magnetic tape, magneto-optical (MO) storage media, or other known non-volatile memory device that is known to be used as a cache memory device.

The metadata, such as metadata 110, may be stored in at least some of storage units 108 or cache devices 109, such that files can be accessed independent of another storage unit. Metadata of each storage unit includes enough information to provide access to the files it contains. In one embodiment, metadata may include fingerprints or representatives contained within data objects 112, where a data object may represent a data segment (also referred to as a data chunk), a compression region (CR) of one or more data segments, or a container of one or more CRs. Fingerprints are mapped to a particular data object via metadata 110, enabling the system to identify the location of the data object containing a data segment represented by a particular fingerprint. A fingerprint may be generated based on at least a portion of a data segment, for example, by applying a predetermined mathematical algorithm (e.g., hash function) to at least a portion of the content of the data segment. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 110 may include a file name, a storage unit identifier (ID) identifying a storage unit in which the segments associated with the file name are stored, reconstruction information for the file using the segments, and any other appropriate metadata information. Metadata 110 may further include a segment ID, a segment sketch, a hash of a segment, an encrypted hash of a segment, random data, or any other appropriate metadata. In some embodiments, metadata associated with a segment is used to identify identical and/or similar data segments. The stored metadata enables a faster identification of identical and/or similar data segments as an ID and/or sketch (e.g., a set of values characterizing the segment) do not need to be recomputed for the evaluation of a given incoming data segment.

In one embodiment, a segment ID includes one or more deterministic functions of a data segment (also referred to as a data segment), one or more hash functions of a data segment, random data, or any other appropriate data segment ID. In various embodiments, a data segment sketch includes one or more deterministic functions of a data segment, one or more hash functions of a data segment, one or more functions that return the same or similar value for the same or similar data segments (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a segment. For example, a sketch may be generated by applying one or more functions (e.g., hash functions) on a segment and a subset of the results of the functions performed on the segment (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, deduplication logic 107 is configured to process or segment files stored in storage system 800 into multiple data segments (also referred to as data chunks, segmented chunks, or chunks) according to a variety of segmentation policies or rules. In one embodiment, each file is processed by the deduplication logic 107 into multiple data segments. In one embodiment, the deduplication logic 107 breaks a file into variable-length data segments or fixed-length data segments based on a variety of rules or considerations. For example, and in one embodiment, the file is broken into multiple data segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, the metadata information 110 includes a file name, a fingerprint (or deduplication key) associated with segments of a file, an identification of a storage unit or cache device where the segments associated with the file name are stored or cached, reconstruction information for the file using the segments, and any other appropriate metadata information. In one embodiment, a main set of metadata information 110 can be reconstructed by using information of all storage units or caches associated with the storage system in the event that the main metadata is lost, corrupted, damaged, etc. Metadata 110 residing in storage unit(s) 108 or cache device(s) 109 can be reconstructed using metadata information 110 stored on a main storage unit 108 or other storage unit or units (e.g., replica storage unit). Metadata information 110 further includes index information (e.g., location information or fingerprints of data segments). In one embodiment, metadata information 110 includes prime segment information that can be used to provide a consistent point of a file system and/or reconstruct a file system in the event of file system failure.

Data deduplication is a process by which a data storage system (e.g., storage system 800) can detect multiple identical copies of data and only keep a single copy of that data, thus eliminating the redundant data by removing other copies of that data and thus improving storage utilization. In at least some systems, data deduplication requires iterating over set of data blocks in one or more storage extents, finding the blocks that contain identical information by processing digest information associated with each block and mapping the identical blocks to a single copy of the data. In such systems, an index table (not shown) of unique digests is created to find commonality among the data set. When a deduplicated data block is updated with a new content, a new data block is created containing the new updated content. Mapping of the deduplicated block is then changed to point to the new data block and the deduplicated block no longer points to the single copy of the data. This process is referred to as reduplication.

In one embodiment, storage system 800 further includes a storage manager or storage controller (not shown) configured to manage storage resources of storage system 800, such as, for example, storage space and processing resources (e.g., processor, memory, network resources). An administrator of management console or server remotely via a management or configuration interface (not shown) may access the storage manager or controller. The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

A replicator (not shown) can be part of system 800. The replicator replicates an original file system on a replicated file system. Both the replicator and clients or devices can access the replicated file system in a storage system. To perform file replication, the replicator may create, delete, or modify files on the replicated file system. In some embodiments, clients can read files on the replicated file system, but may not create, delete or modify files. In some embodiments, the replicator duplicates the replicated file system based on the original file system during initialization. In some embodiments, to efficiently initialize the replicated file system, the original file system is copied to the replicated file system via a network connection or using removable storage media such as backup tapes or optical storage discs.

A file system includes one or more file system blocks. Some of the file system blocks are data blocks, some file system blocks may be indirect block, as described above, or some file system blocks are free blocks that have not yet been allocated to any file in the file system. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block.

Figure 9:
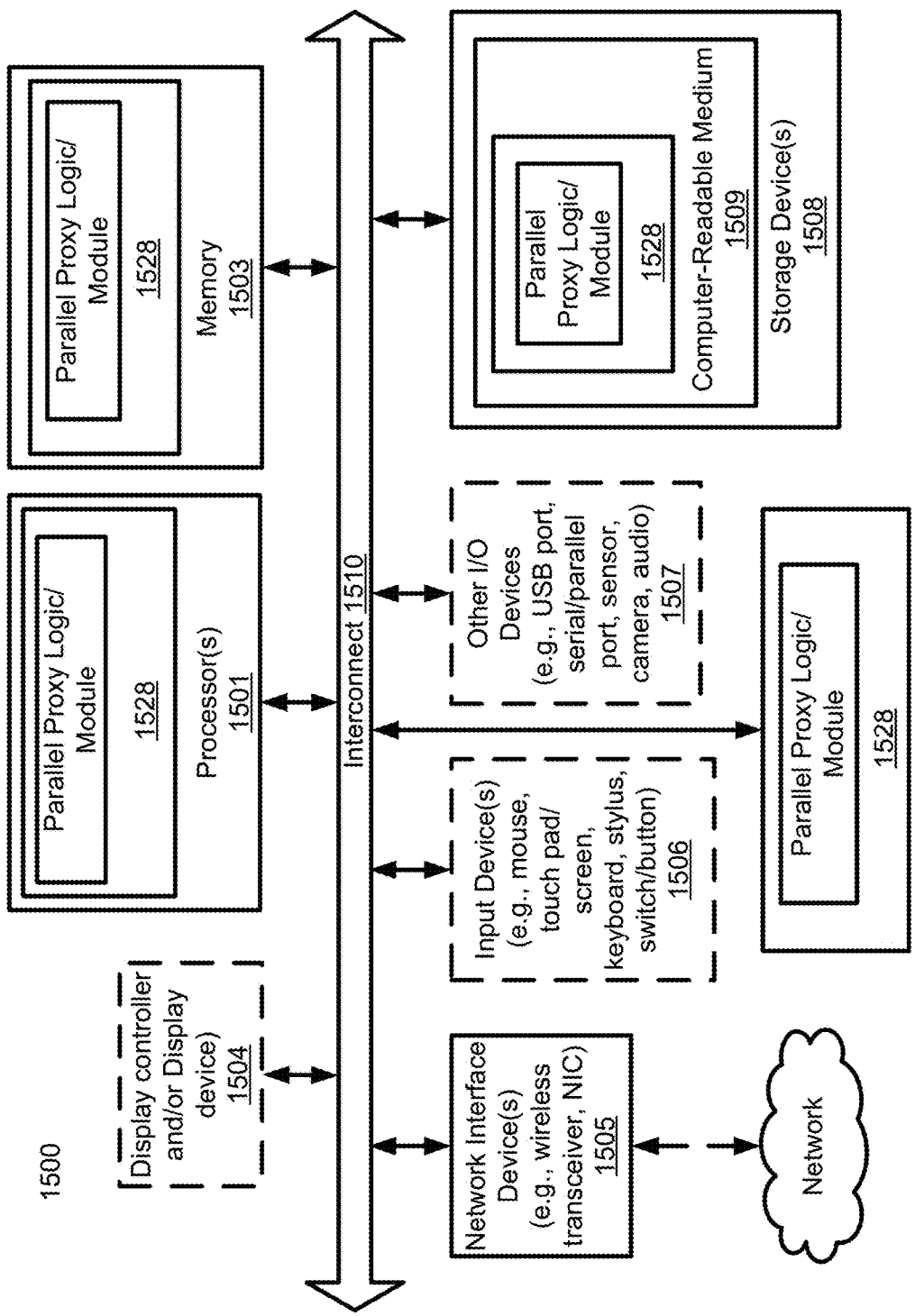
FIG. 9 is a block diagram illustrating a data processing system according to one embodiment that can be used for backing up data associated with an RDBMS according to one embodiment.

FIG. 9 is a block diagram illustrating an example of a data processing system 1500 that may be used with at least one of the embodiments described herein. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high-level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501 or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or a break thereof using any of multiple touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. In addition, a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., parallel proxy module, unit, and/or logic 1528) embodying any one or more of the methodologies or functions described herein. Module/unit/logic 1528 may also reside, completely or at least partially, within memory 1503, and/or within processor 1501 during execution thereof by data processing system 1500, memory 1503, and processor 1501 also constituting machine-accessible storage media. Parallel proxy module, unit, and/or logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Parallel proxy module, unit, and/or logic 1528, components and other features described herein can be implemented as discrete hardware components or integrated in the functionality of hardware components such as ASICS, FPGAs, DSPs, or similar devices. In addition, parallel proxy module, unit, and/or logic 1528 can be implemented as firmware or functional circuitry within hardware devices. Further, parallel proxy module, unit, and/or logic 1528 can be implemented in any combination hardware devices and software components.

Note that while system 1500 is illustrated with various components of a data processing system, it is not intended to represent any particular architecture or manner of interconnecting the components; as such, details are not germane to embodiments of the present invention. It will also be appreciated that network computers, handheld computers, mobile phones, servers, and/or other data processing systems, which have fewer components or perhaps more components, may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments described herein are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for backing up data, comprising:

receiving a request to back up data from a plurality of nodes to a target storage source, the plurality of nodes communicatively coupled to a backup server configured to manage backup of a plurality of storage devices, the plurality of nodes including a primary node and one or more secondary nodes, and each of the primary node and the one or more secondary nodes being configured to provide storage services to data associated with a relational database management system (RDBMS), wherein the plurality of nodes support a plurality of database availability groups, each database availability group comprising a set of databases that fail over together, wherein each of the plurality of nodes stores replicas of datasets from two or more of the plurality of database availability groups, and wherein the backup comprises datasets from two or more of the plurality of database availability groups;
  in response to the request, identifying a plurality of preference nodes from the plurality of nodes based on a preference configuration;
  assigning, using a backup algorithm, portions of the backup to be performed by one or more selected preference nodes from the plurality of identified preference nodes, wherein each portion of the backup is a distinct subset of the data to be backed up, wherein each of the one or more selected preference nodes is assigned a unique portion of the backup, and wherein backing up of at least one database availability group is distributed to two or more of the selected preference nodes, each of which stores a respective unique subset of databases of the at least one database availability group and performs backing up of its respective unique subset of databases of the at least one database availability group; and
  initiating backup operations with the one or more selected preference nodes.

2. The method of claim 1, wherein, when backup of a respective one of the portions is unsuccessful, a notification associated with the respective one of the portions indicates that the respective portion was unsuccessfully backed up and the method further comprises:
  identifying one or more substitute preference nodes from the plurality of preference nodes; and
  re-assigning, using the backup algorithm, the unsuccessfully stored portion of the backup to be performed by the one or more substitute preference nodes.

3. The method of claim 1, wherein the backup algorithm is implemented by at least one of the backup server or the primary node and wherein the identification of the plurality of preference nodes from the plurality of nodes is performed by at least one of the backup server or the primary node.

4. The method of claim 1, wherein the backup algorithm determines the portions of the backup to assign to the respective ones of the plurality of preference nodes based on at least one of:
  a backup policy,
  a size of the data to be backed up, or
  a number of the databases or files that make up the data to be backed up.

5. The method of claim 1, wherein each of the plurality of preference nodes creates its respective portion of the backup, sends its respective portion of the backup to the target storage system, and sends its notification to the backup server independently of operations performed by other ones of the plurality of preference nodes.

6. The method of claim 5, wherein each notification is sent from a respective one of the plurality of preference nodes and received by the primary node, which forwards the notification to the backup server.

7. A non-transitory computer readable medium comprising instructions, which when executed by a processing system, cause the processing system to perform operations for backup, the operations comprising:
  receiving a request to back up data from a plurality of nodes to a target storage source, the plurality of nodes communicatively coupled to a backup server configured to manage backup of a plurality of storage devices, the plurality of nodes including a primary node and one or more secondary nodes, and each of the primary node and the one or more secondary nodes being configured to provide storage services to data associated with a relational database management system (RDBMS), wherein the plurality of nodes support a plurality of database availability groups, each database availability group comprising a set of databases that fail over together, wherein each of the plurality of nodes stores replicas of datasets from two or more of the plurality of database availability groups, and wherein the backup comprises datasets from two or more of the plurality of database availability groups;
  in response to the request, identifying a plurality of preference nodes from the plurality of nodes based on a preference configuration;
  assigning, using a backup algorithm, portions of the backup to be performed by one or more selected preference nodes from the plurality of identified preference nodes, wherein each portion of the backup is a distinct subset of the data to be backed up, wherein each of the one or more selected preference nodes is assigned a unique portion of the backup, and wherein backing up of at least one database availability group is distributed to two or more of the selected preference nodes, each of which stores a respective unique subset of databases of the at least one database availability group and performs backing up of its respective unique subset of databases of the at least one database availability group; and
  initiating backup operations with the one or more selected preference nodes.

8. The non-transitory computer readable medium of claim 7, wherein, when backup of a respective one of the portions is unsuccessful, a notification associated with the respective one of the portions indicates that the respective portion was unsuccessfully backed up and the method further comprises:
  identifying one or more substitute preference nodes from the plurality of preference nodes; and
  re-assigning, using the backup algorithm, the unsuccessfully stored portion of the backup to be performed by the one or more substitute preference nodes.

9. The non-transitory computer readable medium of claim 7, wherein the backup algorithm is implemented by at least one of the backup server or the primary node and wherein the identification of the plurality of preference nodes from the plurality of nodes is performed by at least one of the backup server or the primary node.

10. The non-transitory computer readable medium of claim 7, wherein the backup algorithm determines the portions of the backup to assign to the respective ones of the plurality of preference nodes based on at least one of:
  a backup policy,
  a size of the data to be backed up, or
  a number of the databases or files that make up the data to be backed up.

11. The non-transitory computer readable medium of claim 7, wherein each of the plurality of preference nodes creates its respective portion of the backup, sends its respective portion of the backup to the target storage system, and sends its notification to the backup server independently of operations performed by other ones of the plurality of preference nodes.

12. The non-transitory computer readable medium of claim 11, wherein each notification is sent from a respective one of the plurality of preference nodes and received by the primary node, which forwards the notification to the backup server.

13. A system for backing up data, the system comprising one or more processing devices, the one or more processing devices being configured to:
   receive a request to back up data from a plurality of nodes to a target storage source, the plurality of nodes communicatively coupled to a backup server configured to manage backup of a plurality of storage devices, the plurality of nodes including a primary node and one or more secondary nodes, and each of the primary node and the one or more secondary nodes being configured to provide storage services to data associated with a relational database management system (RDBMS), wherein the plurality of nodes support a plurality of database availability groups, each database availability group comprising a set of databases that fail over together, wherein each of the plurality of nodes stores replicas of datasets from two or more of the plurality of database availability groups, and wherein the backup comprises datasets from two or more of the plurality of database availability groups;
   in response to the request, identify a plurality of preference nodes from the plurality of nodes based on a preference configuration;
   assign, using a backup algorithm, portions of the backup to be performed by one or more selected preference nodes from the plurality of identified preference nodes, wherein each portion of the backup is a distinct subset of the data to be backed up, wherein each of the one or more selected preference nodes is assigned a unique portion of the backup, and wherein backing up of at least one database availability group is distributed to two or more of the selected preference nodes, each of which stores a respective unique subset of databases of the at least one database availability group and performs backing up of its respective unique subset of databases of the at least one database availability group; and
   initiate backup operations with the one or more selected preference nodes.

14. The system of claim 13, wherein, when backup of a respective one of the portions is unsuccessful, a notification associated with the respective one of the portions indicates that the respective portion was unsuccessfully backed up and the method further comprises:
   identify one or more substitute preference nodes from the plurality of preference nodes; and
   re-assign, using the backup algorithm, the unsuccessfully stored portion of the backup to be performed by the one or more substitute preference nodes.

15. The system of claim 13, wherein the backup algorithm is implemented by at least one of the backup server or the primary node and wherein the identification of the plurality of preference nodes from the plurality of nodes is performed by at least one of the backup server or the primary node.

16. The system of claim 13, wherein the backup algorithm determines the portions of the backup to assign to the respective ones of the plurality of preference nodes based on at least one of:
   a backup policy,
   a size of the data to be backed up, or
   a number of the databases or files that make up the data to be backed up.

17. The system of claim 13, wherein each of the plurality of preference nodes creates its respective portion of the backup, sends its respective portion of the backup to the target storage system, and sends its notification to the backup server independently of operations performed by other ones of the plurality of preference nodes.

18. The system of claim 17, wherein each notification is sent from a respective one of the plurality of preference nodes and received by the primary node, which forwards the notification to the backup server.

* * * * *